United States Patent
Czanta et al.

(10) Patent No.: US 7,740,918 B2
(45) Date of Patent: *Jun. 22, 2010

(54) LIQUID CRYSTALLINE MEDIUM AND LIQUID CRYSTAL DISPLAY

(75) Inventors: Markus Czanta, Darmstadt (DE); Harald Hirschmann, Darmstadt (DE); Peer Kirsch, Kanagawa (JP); Volker Reiffenrath, Rossdorf (DE); Marcus Reuter, Darmstadt (DE); Christian Hock, Mainaschaff (DE); Sayuri Ogiri, Kanagawa Pref. (JP); Shinji Nakajima, Kanagawa Pref. (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/404,699

(22) Filed: Mar. 16, 2009

(65) Prior Publication Data

US 2009/0184291 A1    Jul. 23, 2009

Related U.S. Application Data

(62) Division of application No. 11/723,190, filed on Mar. 16, 2007, now Pat. No. 7,563,491.

(30) Foreign Application Priority Data

Mar. 17, 2006    (EP)    .................. 06005479

(51) Int. Cl.
   C09K 19/34    (2006.01)
   C09K 19/30    (2006.01)
   C09K 19/20    (2006.01)
   C09K 19/12    (2006.01)

(52) U.S. Cl. .............. 428/1.1; 252/299.61; 252/299.63; 252/299.66; 252/299.67

(58) Field of Classification Search ............ 252/299.61, 252/299.63, 299.66, 299.67; 428/1.1
   See application file for complete search history.

(56) References Cited

U.S. PATENT DOCUMENTS

| | | |
|---|---|---|
| 5,714,087 A | 2/1998 | Pausch et al. |
| 5,841,499 A | 11/1998 | Baur et al. |
| 5,958,290 A | 9/1999 | Coates et al. |
| 6,027,665 A | 2/2000 | Pausch et al. |
| 6,342,279 B1 | 1/2002 | Tarumi et al. |
| 6,759,102 B2 | 7/2004 | Murashiro et al. |
| 7,033,652 B2 | 4/2006 | Heckmeier et al. |
| 7,553,522 B2 * | 6/2009 | Heckmeier et al. ........... 428/1.1 |
| 7,563,491 B2 * | 7/2009 | Czanta et al. ................ 428/1.1 |
| 2003/0085382 A1 | 5/2003 | Murashiro et al. |
| 2003/0186002 A1 | 10/2003 | Heckmeier et al. |
| 2007/0034829 A1 * | 2/2007 | Heckmeier et al. ..... 252/299.01 |

FOREIGN PATENT DOCUMENTS

| | | |
|---|---|---|
| DE | 40 00 451 | 7/1991 |
| DE | 4112003 | 10/1991 |
| DE | 19528106 | 8/1996 |
| DE | 19509410 | 9/1996 |
| DE | 19528107 | 9/1996 |
| EP | 0588568 A2 | 3/1994 |
| EP | 0673986 | 9/1995 |
| JP | 07-181439 | 7/1995 |
| WO | WO 91/05029 | 4/1991 |
| WO | WO 91/16396 | 10/1991 |
| WO | WO 96/23851 | 8/1996 |
| WO | WO 96/28521 | 9/1996 |
| WO | WO 2005/123879 | 12/2005 |

OTHER PUBLICATIONS

Patent Abstracts of Japan, Active Matrix Liquid Crystal Display Device, JP07-181439, Masato OE et al, Jul. 21, 1995.

* cited by examiner

*Primary Examiner*—Shean C Wu
(74) *Attorney, Agent, or Firm*—Millen, White, Zelano, Branigan, P.C.

(57) ABSTRACT

A dielectrically positive liquid crystalline media comprising:
  a first dielectrically positive component, component A, comprising a dielectrically neutral compound of formula I

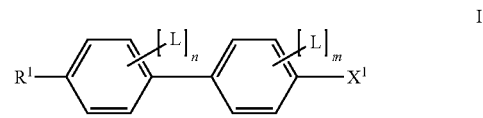

wherein the parameters have the meanings defined herein;
  a second dielectrically positive component, component B, comprising one or more dielectrically positive compounds having a dielectric anisotropy of more than 3; and
  optionally a dielectrically neutral component, component C, comprising one or more dielectrically neutral compounds having a dielectric anisotropy in the range from −1.5 to 3,
are suitable for use in liquid crystal displays, especially active matrix displays, and in particular TN and to IPS displays.

26 Claims, No Drawings

LIQUID CRYSTALLINE MEDIUM AND LIQUID CRYSTAL DISPLAY

This application is a divisional of application Ser. No. 11/723,190, filed Mar. 16, 2007 now U.S. Pat. No. 7,563,491.

FIELD OF THE INVENTION

The present invention relates to liquid crystalline media and to liquid crystal displays comprising these media, especially to displays addressed by an active matrix and in particular to displays of the twisted nematic or of the in plane switching type.

STATE OF THE ART AND PROBLEM TO BE SOLVED

Liquid Crystal Displays (LCDs) are widely used to display information. LCDs are used for direct view displays, as well as for projection type displays. Electro-optical modes employed are, e.g., the twisted nematic (TN)-, the super twisted nematic (STN)-, the optically compensated bend (OCB)- and the electrically controlled birefringence (ECB)-mode with their various modifications, as well as others. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like, e.g., the In-Plane Switching mode (as disclosed, e.g., in DE 40 00 451 and EP 0 588 568). Especially, this electro-optical mode is used for LCDs for modern desktop monitors and is envisaged to be applied for displays for multi media applications. The liquid crystals according to the present invention are preferably used in this type of displays.

For these displays new liquid crystalline media with improved properties are required. Especially the response times have to be improved for many types of applications. Thus, liquid crystalline media with lower viscosities ($\eta$), especially with lower rotational viscosities ($\gamma_1$) are required. In practical liquid crystalline media the rotational viscosity is correlated both with the threshold voltage and the operation voltage of the media. Thus, the rotational viscosity preferably should, e.g., for a medium with a clearing point of about 75° C. and a threshold voltage of about 2.0 V be 75 mPa·s or less, preferably 60 mPa·s or less, and especially 55 mPa·s or less. Besides this parameter, the media have to exhibit a suitably wide range of the nematic phase, an appropriate birefringence ($\Delta n$) and dielectric anisotropy ($\Delta \in$) should be high enough to allow a reasonably low operation voltage. Preferably, $\Delta \in$ should be higher than 4 and very preferably higher than 5, preferably, however, not higher than 15 and in particular not higher than 12, as this would be detrimental for an at least reasonably high specific resistivity.

The displays according to the present invention are preferably addressed by an active matrix (active matrix LCDs, short AMDs), preferably by a matrix of thin film transistors (TFTs). However, the inventive liquid crystals can also beneficially be used in displays with other known addressing means.

There are various different display modes using composite systems of liquid crystal materials of low molecular weight together with polymeric materials. These are, e.g., polymer dispersed liquid crystal (PDLC)-, nematic curvilinearily aligned phase (NCAP)- and polymer network (PN)-systems, as disclosed, for example, in WO 91/05 029 or axially symmetric microdomain (ASM) systems and others. In contrast to these, the modes especially preferred according to the instant invention are using the liquid crystal medium as such, oriented on surfaces. These surfaces typically are pre-treated to achieve uniform alignment of the liquid crystal material. The display modes according to the instant invention preferably use an electrical field substantially parallel to the composite layer.

Liquid crystal compositions suitable for LCDs and especially for IPS displays are known, e.g., from JP 07-181 439 (A), EP 0 667 555, EP 0 673 986, DE 195 09 410, DE 195 28 106, DE 195 28 107, WO 96/23 851 and WO 96/28 521. These compositions, however, do have significant drawbacks. Most of them, amongst other deficiencies, lead to unfavorably long response times, have too low values of the resistivity and/or require operation voltages, which are too high. Further, many of the existing liquid crystal material are not particularly stable under storage at low temperatures.

Thus, there is a significant need for liquid crystalline media with suitable properties for practical applications such as a wide nematic phase range, appropriate optical anisotropy $\Delta n$, according to the display mode used, a high $\Delta \in$, and especially low viscosities.

SUMMARY OF THE INVENTION

Surprisingly, it now has been found that liquid crystalline media with a suitably high $\Delta \in$, a suitable phase range, and $\Delta n$ can be realized, which do not exhibit the drawbacks of the materials of the prior art or at least do exhibit them to a significantly lesser degree.

Upon further study of the specification and appended claims, further aspects and advantages of this invention will become apparent to those skilled in the art.

These improved liquid crystalline media according to the instant application comprise at least the following components:

a first dielectrically positive component, component A, comprising a dielectrically positive compound of formula I

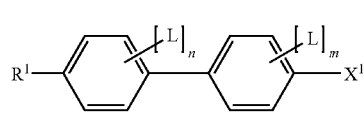

wherein
  R¹ is alkyl, alkoxy, fluorinated alkyl or fluorinated alkoxy with 1 to 7 C-atoms or alkenyl, alkenyloxy, alkoxyalkyl, or fluorinated alkenyl with 2 to 7 C-atoms, and preferably is alkyl or alkenyl, most preferably alkyl,
  X¹ is halogen, preferably Cl or F and most preferably Cl,
  L are independently of each other, Cl or F, preferably F, and
  n and m are, independently of each other, each an integer from 0 to 4, preferably 0, 1 or 2 and most preferably one of them is 1 and the other one is 0, a second dielectrically positive component, component B, comprising one or more dielectrically positive compounds having a dielectric anisotropy of more than 3, and optionally a dielectrically neutral component, component C, comprising one or more dielectricaliy neutral compounds having a dielectric anisotropy in the range from −1.5 to 3.

Preferably, the concentration of component A in the medium is 0.1% to 20%, more preferably 0.5% to 15%, even more preferably 1% to 10% and most preferably from 1.5% to 8%.

Preferably, the first dielectrically positive component, component A, comprises, more preferably consists predominantly of, even more preferably consists essentially, and most preferably consists entirely of dielectrically positive compounds of formula Ia

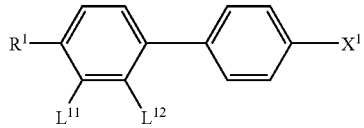

Ia wherein
$R^1$ and $X^1$ have the respective meanings given under formula I above, and
one of $L^{11}$ and $L^{12}$ is F and the other one is H.

The isotropic refractive index ($n_{iso}$) of the compounds of formula Ia preferably used according to the instant invention is 1.57 or more. The isotropic refractive index ($n_{iso}$) is calculated as $n_{iso}=(n_e+2n_o)/3$ from the refractive indices $n_e$ and $n_o$ extrapolated from a solution of 10% of the compound of interest in ZLI-4792.

Especially preferred are compounds of formula I selected from the sub-formulae Ia-1 to Ia-4

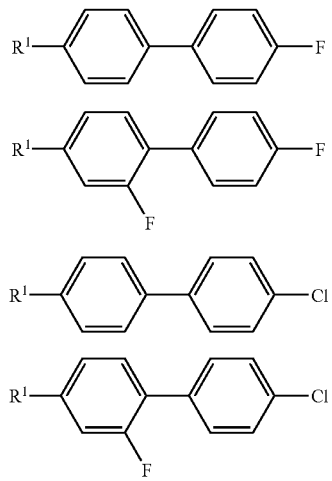

Ia-1

Ia-2

Ia-3

Ia-4 wherein
$R^1$ has the meaning given under formula I above.

Preferably, the second dielectrically positive component, component B, comprises, more preferably consists predominantly of, even more preferably consists essentially, and most preferably it consists entirely of dielectrically positive compounds having a dielectric anisotropy of more than 3.

Preferably, this component, component B, comprises, more preferably consists predominantly of, even more preferably consists essentially, and most preferably consists entirely of one or more dielectrically positive compounds having a dielectric anisotropy of more than 3, selected from formulae II and III

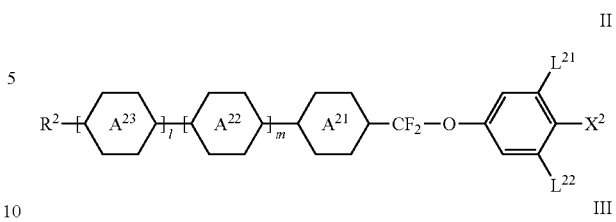

II

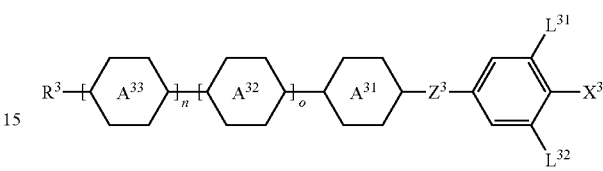

III wherein
$R^2$ and $R^3$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and $R^2$ and $R^3$ preferably are alkyl or alkenyl,

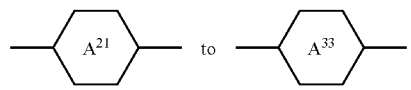

are, independently of each other,

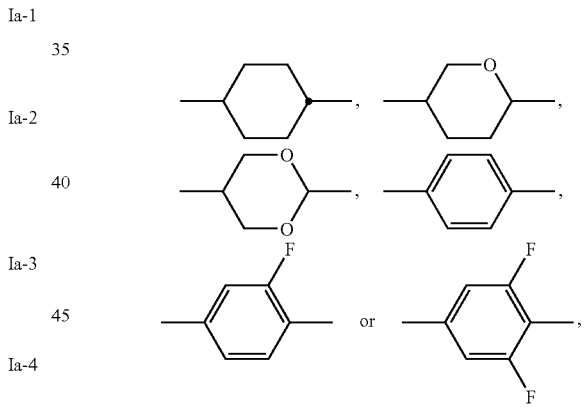

$L^{21}$, $L^{22}$, $L^{31}$ and $L^{32}$, are, independently of each other, H or F, preferably $L^{21}$ and/or $L^{31}$ is F, $X^2$ and $X^3$ are, independently of each other, halogen, halogenated alkyl or halogenated alkoxy with 1 to 3 C-atoms or halogenated alkenyl or alkenyloxy with 2 or 3 C-atoms, preferably F, Cl, —OCF$_3$ or —CF$_3$, most preferably F, Cl or —OCF$_3$, $Z^3$ is —CH$_2$CH$_2$—, —CF$_2$CF$_2$—, —COO—, trans- —CH═CH—, trans- —CF═CF—, —CH$_2$O— or a single bond, preferably —CH$_2$CH$_2$—, —COO—, trans- —CH═CH— or a single bond and most preferably —COO—, trans- —CH═CH—, trans- or a single bond, and l, m, n and o are, independently of each other, 0 or 1.

In a preferred embodiment of the present invention component B, comprises, more preferably consists predominantly of, even more preferably consists essentially, and most preferably consists entirely of one or more dielectrically positive compounds having a dielectric anisotropy of more than 3, selected from formulae II-1 and II-2

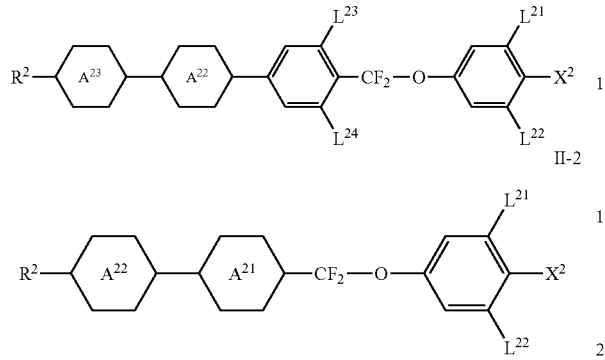

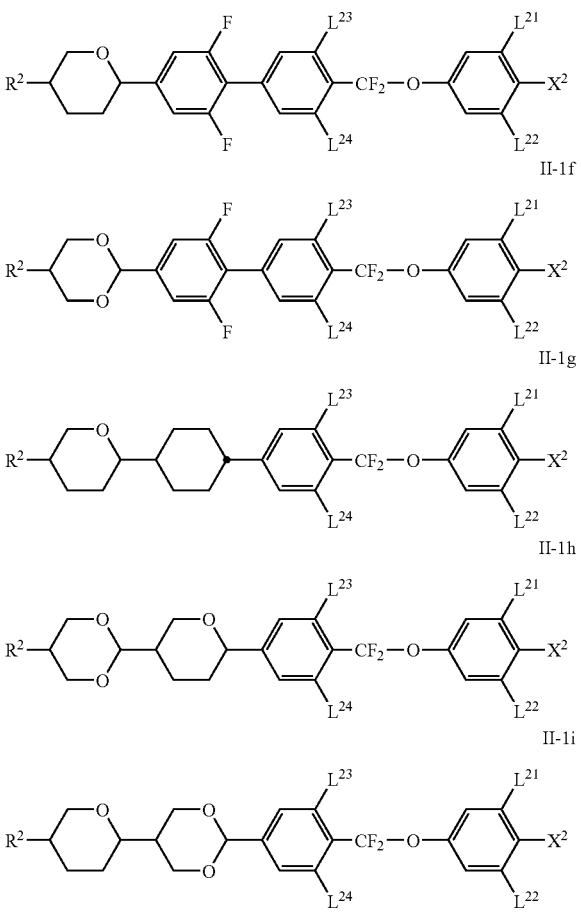

wherein the parameters have the respective meanings given under formula II above and in Formula II-1 and the parameters $L^{23}$ and $L^{24}$ are, independently of each other and of the other parameters, H or F.

Preferably, component B comprises compounds selected from the group of compounds of formulae II-1 and II-2, wherein $L^{21}$ and $L^{22}$ and/or $L^{23}$ and $L^{24}$ are both F In a preferred embodiment component B comprises compounds selected from the group of compounds of formulae II-1 and II-2, wherein $L^{21}$, $L^{22}$, $L^{23}$ and $L^{24}$ all are F.

Preferably, component B comprises one or more compounds of formula II-1. Preferably, the compounds of formula II-1 are selected from the group of compounds of formulae II-1a to II-1i

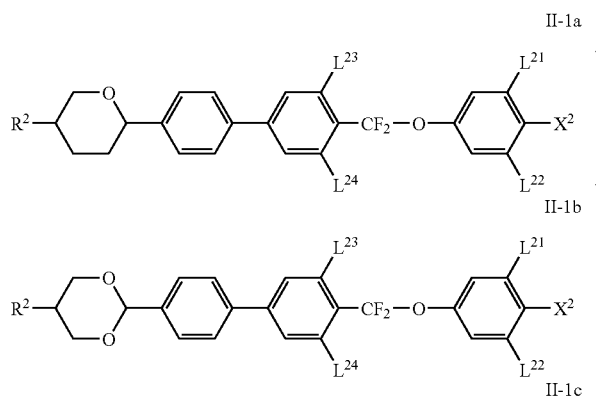

wherein the parameters have the respective meanings given above.

Preferably, component B comprises compounds selected from the group of compounds of formulae II-1a to II-1e wherein $L^{21}$ and $L^{22}$ and/or $L^{31}$ and $L^{32}$ are both F In a preferred embodiment component B comprises compounds selected from the group of compounds of formulae I-1a to II-1e, wherein $L^{21}$, $L^{31}$ and $L^{32}$ all are F.

Especially preferred compounds of formula II-1 are

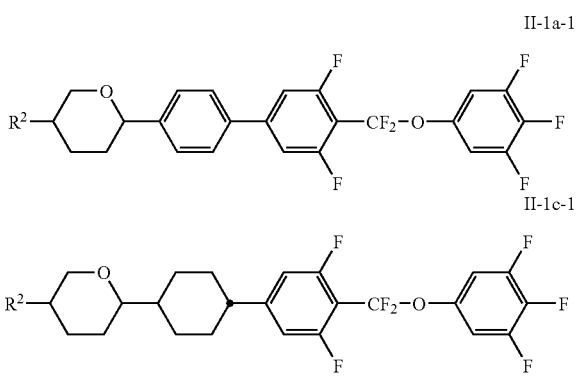

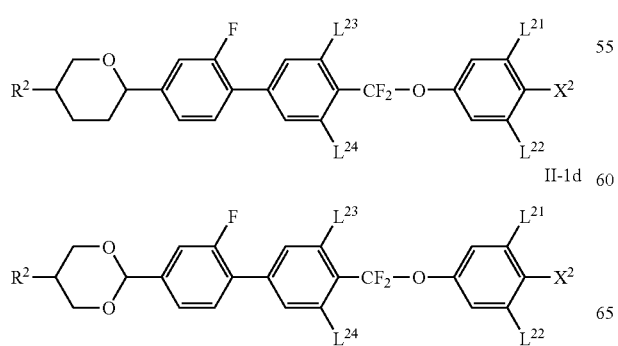

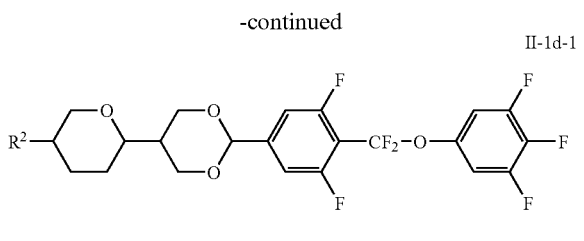

II-1d-1 wherein the $R^2$ has the meaning given above.

Preferably, Component B comprises one or more compounds of formula II-2. Preferably, the compounds of formula II-2 are selected from the group of compounds of formulae II-2a to II-2d

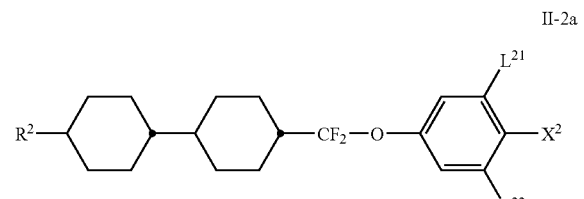

II-2a

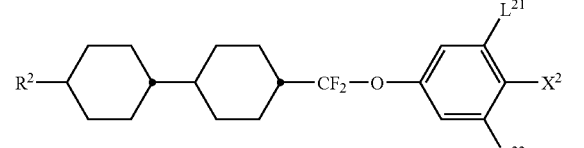

II-2b

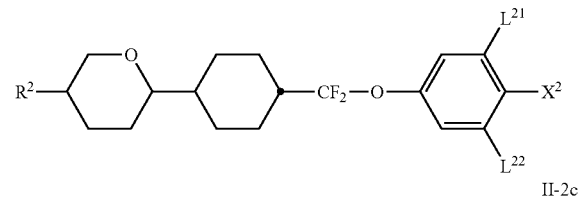

II-2c

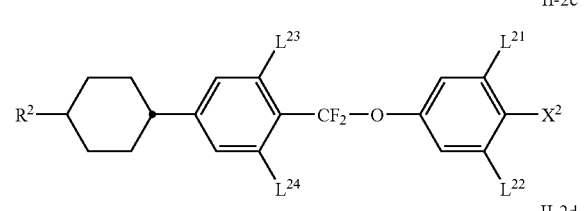

II-2d wherein the parameters have the respective meanings given above and preferably
$L^{21}$ and $L^{22}$ are both F and $L^{31}$ and $L^{32}$, are both H or
$L^{21}$, $L^{22}$, $L^{31}$ and $L^{32}$ are all F Especially preferred compounds of formula II-2 are

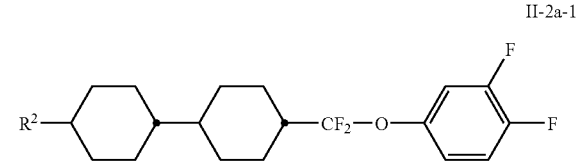

II-2a-1

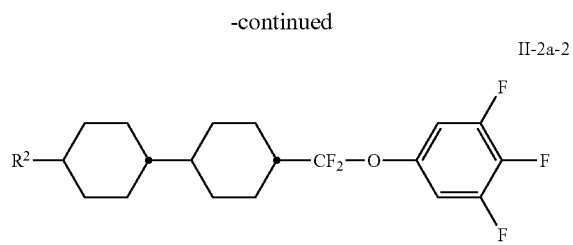

II-2a-2

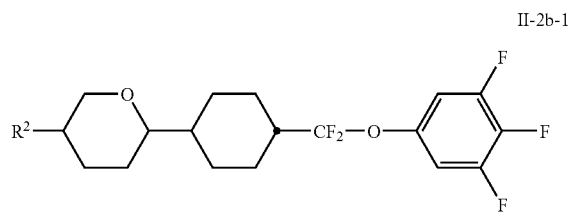

II-2b-1

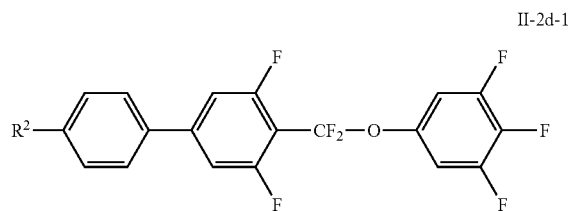

II-2d-1

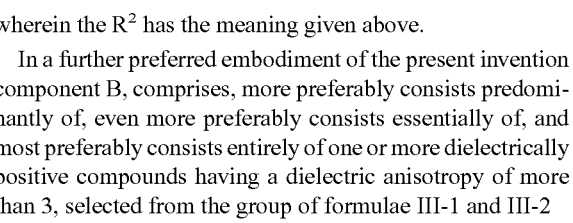

wherein the $R^2$ has the meaning given above.

In a further preferred embodiment of the present invention component B, comprises, more preferably consists predominantly of, even more preferably consists essentially of, and most preferably consists entirely of one or more dielectrically positive compounds having a dielectric anisotropy of more than 3, selected from the group of formulae III-1 and III-2

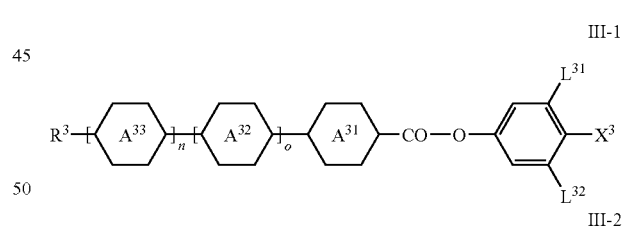

III-1

III-2 wherein the parameters have the respective meanings given under formula III above.

Preferably, component B comprises one or more compounds of formula III-1. Preferably, the compounds of formula III-1 are selected from the group of compounds of formulae III-1a and III-1b

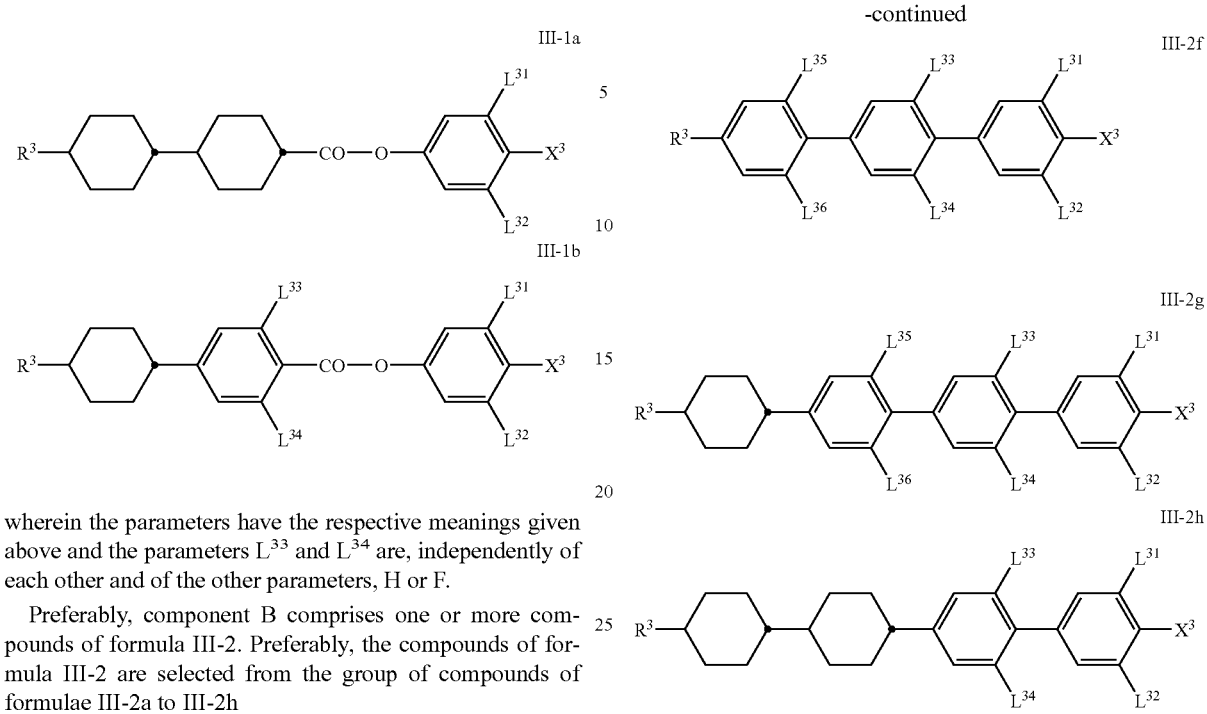

wherein the parameters have the respective meanings given above and the parameters $L^{33}$ and $L^{34}$ are, independently of each other and of the other parameters, H or F.

Preferably, component B comprises one or more compounds of formula III-2. Preferably, the compounds of formula III-2 are selected from the group of compounds of formulae III-2a to III-2h wherein the parameters have the respective meanings given above, and $L^{35}$ and $L^{36}$ are, independently of each other and the other parameters, H or F.

Preferably, component B comprises one or more compounds of formula III-1a, which preferably are selected from the group of compounds of formulae III-1a-1 to III-1a-6

-continued

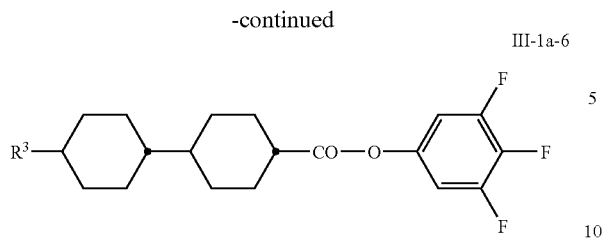
III-1a-6 wherein the $R^3$ has the meaning given above.

Preferably, component B comprises one or more compounds of formula III-2a, which are preferably selected from the group of compounds of formulae III-2a-1 to III-2a-4

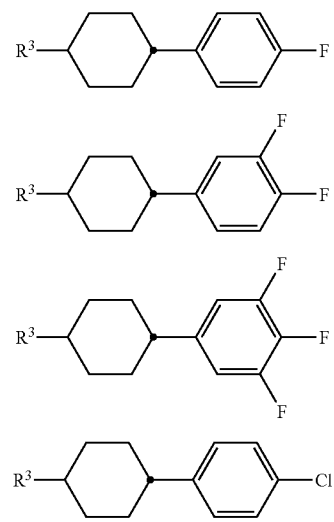

III-2a-1
III-2a-2
III-2a-3
III-2a-4 wherein the $R^3$ has the meaning given above.

Preferably, component B comprises one or more compounds of formula III-2b, which are preferably selected from the group of compounds of formulae III-2b-1 to III-2b-6

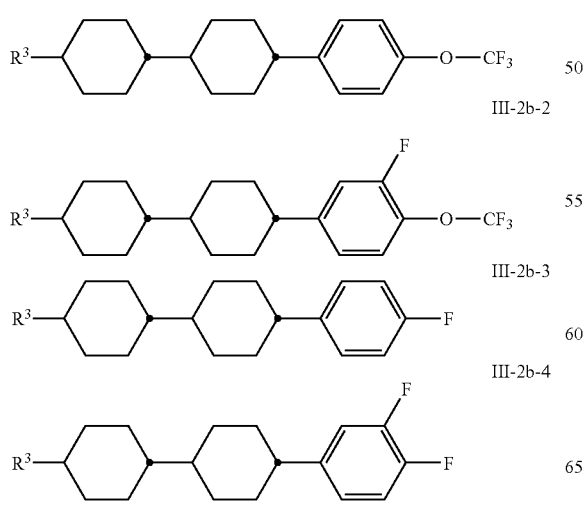

III-2b-1
III-2b-2
III-2b-3
III-2b-4

-continued

III-2b-5

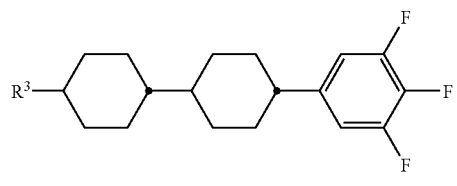
III-2b-6 wherein the $R^3$ has the meaning given above.

Preferably, component B comprises one or more compounds selected from the group of compounds of formulae III-2c and III-2d, which are preferably selected from the group of compounds of formulae III-2c-1 and III-2d-1

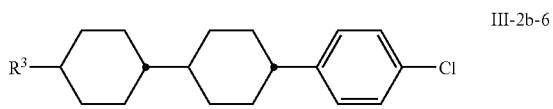

III-2c-1
III-2d-1

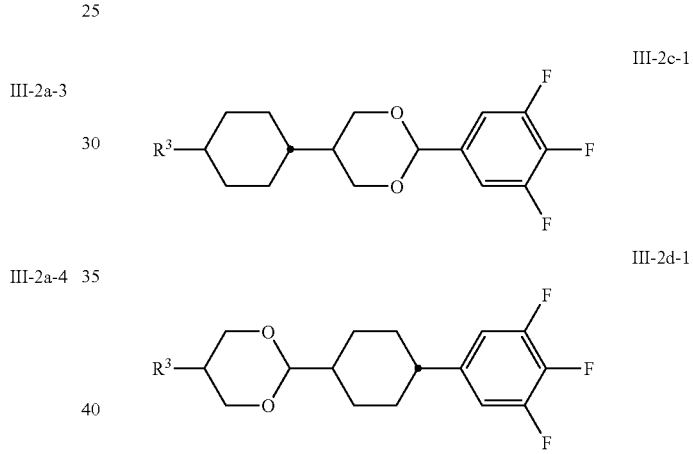

wherein the $R^3$ has the meaning given above.

Preferably, component B comprises one or more compounds of formula III-2e, which are preferably selected from the group of compounds of formulae I'-2e-1 to III-2e-5

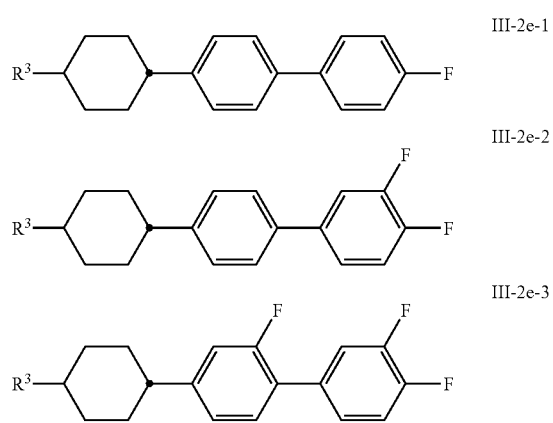

III-2e-1
III-2e-2
III-2e-3

-continued

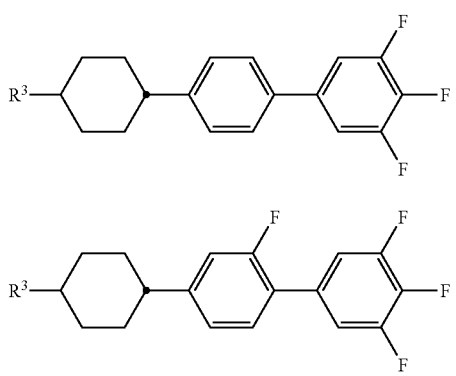

wherein the $R^3$ has the meaning given above.

Preferably, component B comprises one or more compounds of formula III-2f, which are preferably selected from the group of compounds of formulae III-2f-1 to III-2f-5

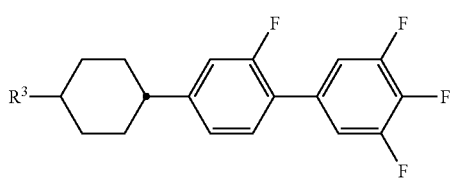

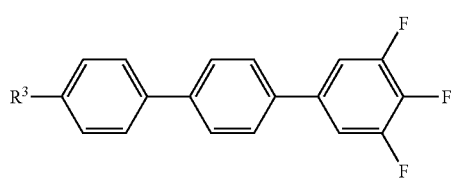

wherein the $R^3$ has the meaning given above.

Preferably, component B comprises one or more compounds of formula III-2g, which are preferably selected from the group of compounds of formulae II-2g-1 to III-2g-3

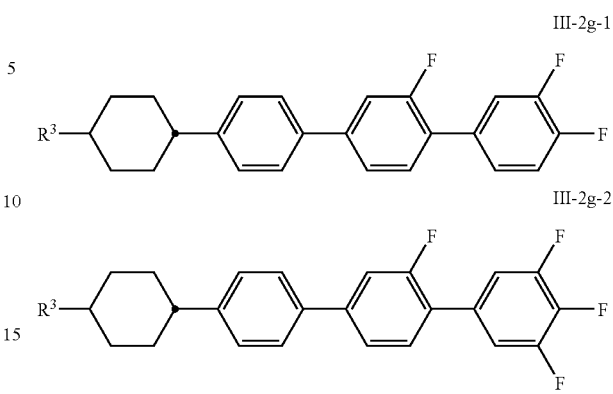

wherein the $R^3$ has the meaning given above.

Preferably, component B comprises one or more compounds of formula III-2h, which are preferably selected from the group of compounds of formulae III-2h-1 to III-2h-3

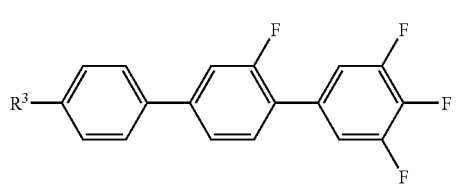
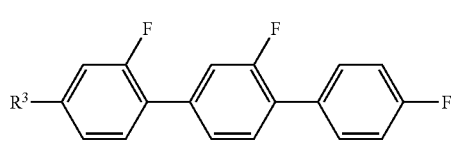
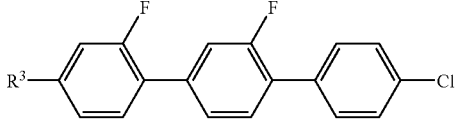

wherein the $R^3$ has the meaning given above.

Alternatively or additionally to compounds of formulae III-1 and/or III-2 the media according to the present invention may comprise one or more compounds of formula III-3

III-3

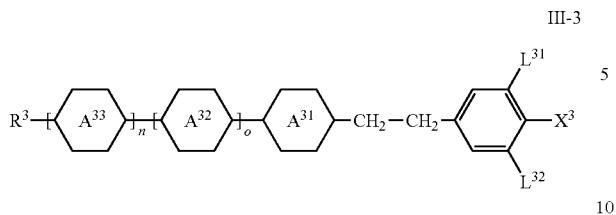

wherein the parameters have the respective meanings given under formula III above, and preferably of formula III-3a III-3a

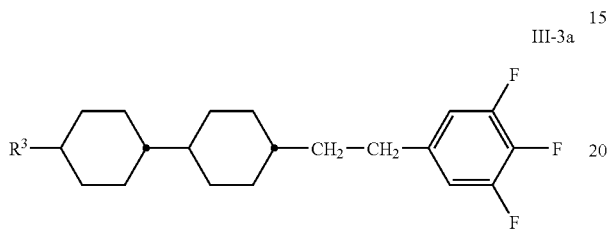

wherein the R³ has the meaning given above.

Preferably, the liquid crystalline media according to the present invention comprise a dielectrically neutral component, component C. This component has a dielectric anisotropy in the range from −1.5 to 3. Preferably, component C comprises, preferably consists predominantly of, preferably consists essentially of, and especially preferably consists entirely of dielectrically neutral compounds, having a dielectric anisotropy in the range from −1.5 to 3. Preferably, this component comprises one or more, more preferably comprises predominantly of, more preferably consists essentially of, and especially preferably consists entirely of dielectrically neutral compounds, having a dielectric anisotropy in the range from −1.5 to 3, of formula IV

IV

wherein compounds of formula I are excluded from formula IV,
$R^{41}$, and $R^{42}$, independently of each other have the meaning given for $R^2$ under formula II above, preferably $R^{41}$ is alkyl and $R^{42}$ is alkoxy,

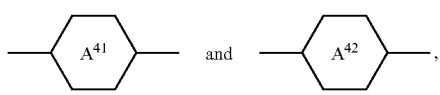

independently of each other, and in case

is present twice, also these, independently of each other, are

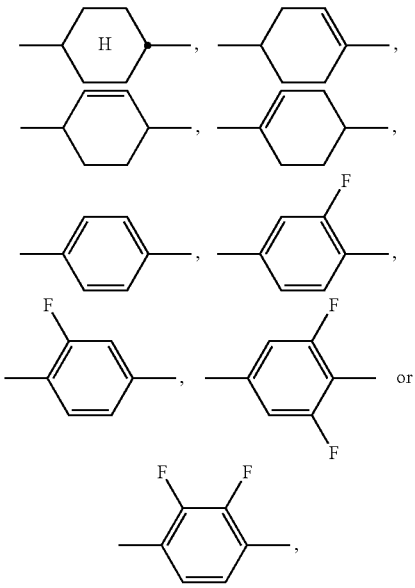

preferably at least one of

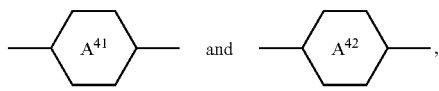

is,

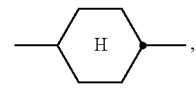

$Z^{41}$ and $Z^{42}$ are, independently of each other, and in case $Z^{41}$ is present twice, also these independently of each other, —CH₂CH₂—, —COO—, trans- —CH=CH—, trans- —CF=CF—, —CH₂O—, —CF₂O— or a single bond, preferably at least one of them is a single bond, and
p is 0, 1 or 2, preferably 0 or 1.

Preferably, the dielectrically neutral component, component C, comprises one or more compounds selected from the group of compounds of formulae IV-1 to IV-6

IV-1

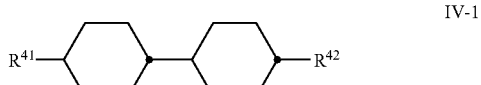

IV-2

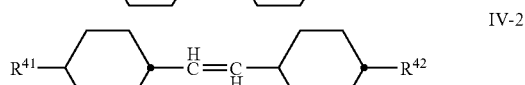

IV-3

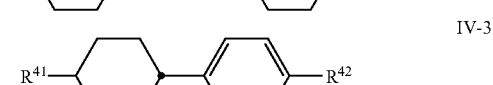

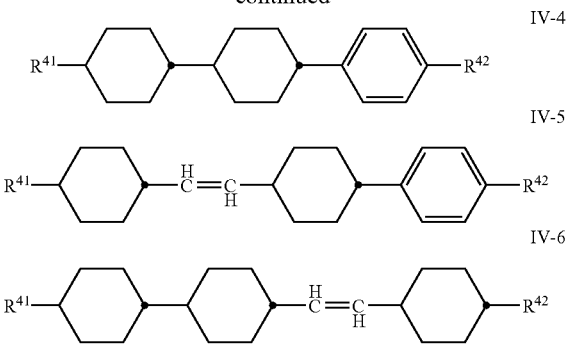

wherein compounds of formula I are excluded from formula IV-1, $R^{41}$ and $R^{42}$ have the respective meanings given under formula IV above, and in formulae IV-1, IV-4 and IV-5 $R^{41}$ preferably is alkyl or alkenyl, preferably alkenyl and $R^{42}$ preferably is alkyl or alkenyl, preferably alkyl, in formula IV-2 $R^{41}$ and $R^{42}$ preferably are alkyl, and in formula IV-3 $R^{41}$ preferably is alkyl or alkenyl, preferably alkyl and $R^{42}$ preferably is alkyl or alkoxy, preferably alkoxy.

Preferably, the dielectrically neutral component, component C, comprises one or more compounds selected from the group of compounds of formulae IV-1, IV-3, IV-4 and IV-5, preferably one or more compounds of formula IV-1 and one or more compounds selected from the group of formulae IV-3 and IV-4, preferably one or more compounds each of formulae IV-1, IV-3 and IV-4 and most preferably one or more compounds each of formulae IV-1, IV-3, IV-4 and IV-5.

Preferably, the dielectrically neutral component, component C, comprises one or more compounds selected from the group of compounds of formulae IV-1a, IV-1b, IV-4-a, and IV-4-b, IV-6a and IV-6b

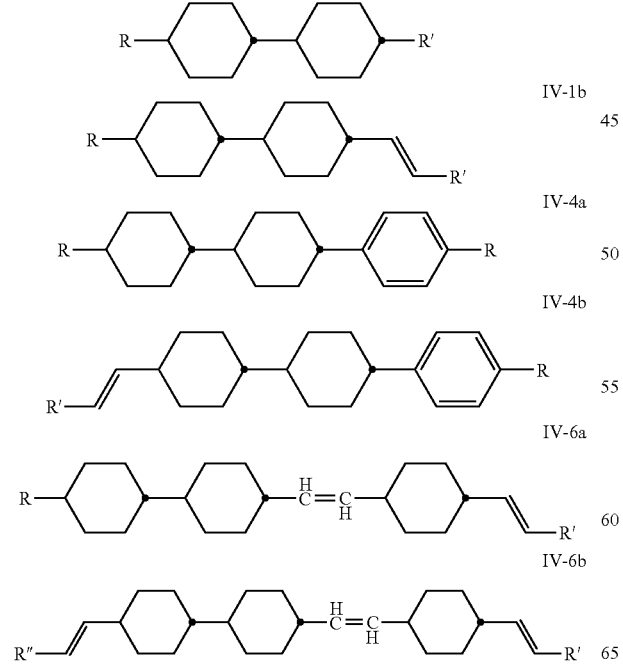

wherein

R is alkyl with 1 to 5, preferably with 1 to 3 C-atoms,

R' is H or alkyl with 1 to 3, preferably with 1 to 2 C-atoms, preferably H or methyl and R" is H or alkyl with 1 to 3, preferably with 1 to 2 C-atoms, preferably H.

In a further preferred embodiment of the present invention, which may be part of the previously described embodiments or a different one, the liquid crystal mixtures according to the present invention comprise component C, comprising, preferably predominantly consisting of, more preferably consisting essentially of, and most preferably entirely consisting of compounds of formula IV selected from the group of compounds of formulae IV-1 to IV-6, as shown above, and optionally of formulae IV-7 to IV-14

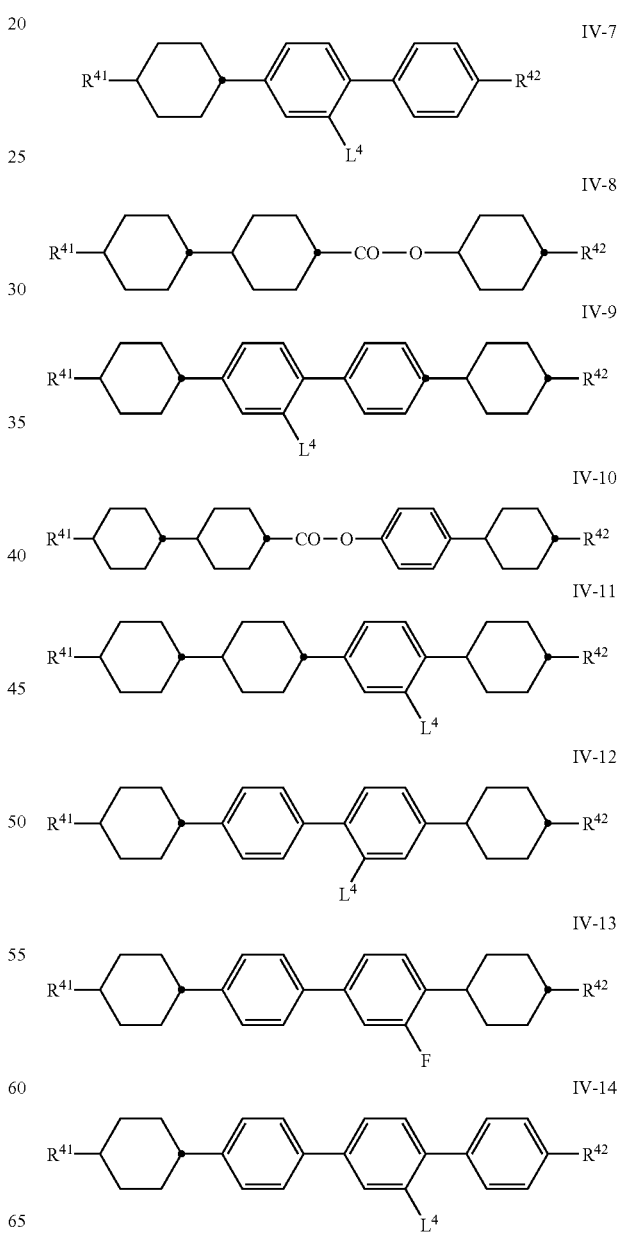

wherein
R$^{41}$ and R$^{42}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and
L$^4$ is H or F.

Alternatively or additionally to compounds of formulae II and/or III, the media according to the present invention may comprise one or more dielectrically positive compounds of formula V

V

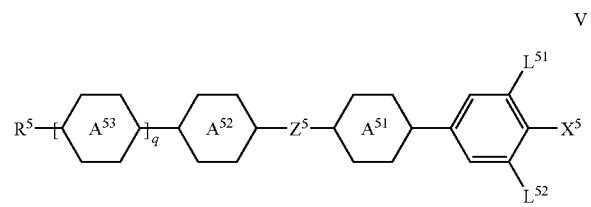

wherein
R$^5$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and R$^1$ preferably is alkyl or alkenyl,

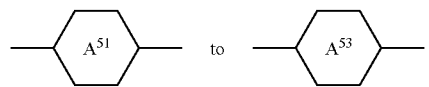

are, independently of each other,

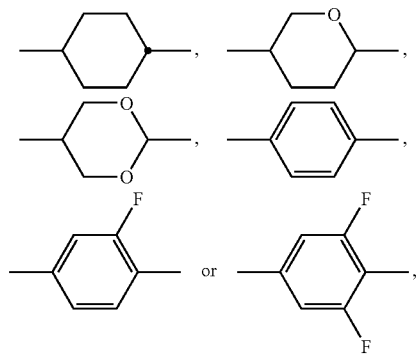

L$^{51}$ and L$^{52}$, are, independently of each other, H or F, preferably L$^{51}$ is F and
X$^5$ is halogen, halogenated alkyl or alkoxy with 1 to 3 C-atoms or halogenated alkenyl or alkenyloxy with 2 or 3 C-atoms, preferably F, Cl, —OCF$_3$ or —CF$_3$, most preferably F, Cl or —OCF$_3$,
Z$^5$ is —CH$_2$CH$_2$—, —CF$_2$CF$_2$—, —COO—, trans- —CH=CH—, trans- —CF=CF— or —CH$_2$O, preferably —CH$_2$CH$_2$—, —COO— or trans- —CH=CH— and most preferably —COO— or —CH$_2$CH$_2$—, and
q is 0 or 1.

Preferably, the media according to the present invention comprises one or more compounds of formula V, preferably selected from the group of compounds of formulae V-1 and V-2

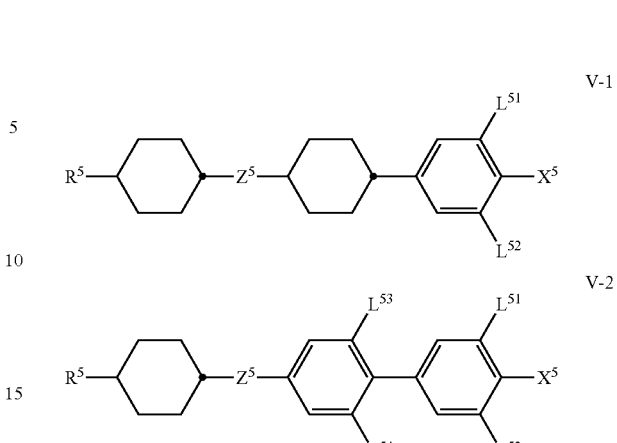

wherein the parameters have the respective meanings given above and the parameters L$^{53}$ and L$^{54}$ are, independently of each other and of the other parameters, H or F and preferably Z$^5$ is —CH$_2$—CH$_2$—.

Preferably, the compounds of formula V-1 are selected from the group of compounds of formulae V-1a and V-1b

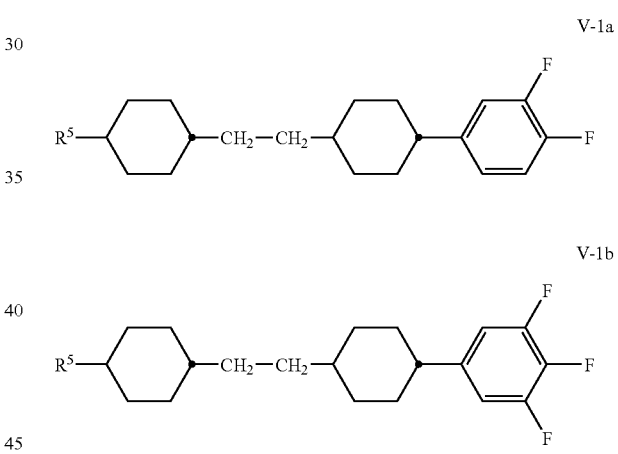

wherein the R$^5$ has the meaning given above.

Preferably, the compounds of formula V-2 are selected from the group of compounds of formulae V-2a to V-2d

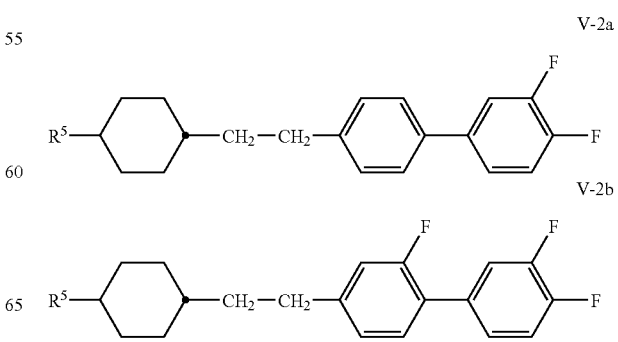

-continued

V-2c

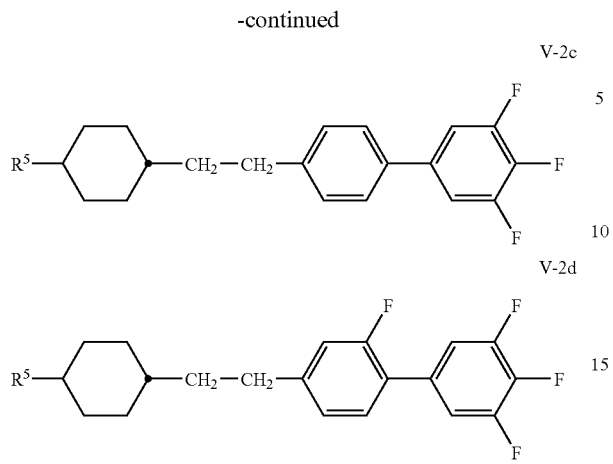

V-2d wherein the $R^5$ has the meaning given above.

Preferably, the liquid crystalline media according to the present invention comprise an additional dielectrically neutral component, component D. This component has a dielectric anisotropy in the range from −1.5 to 3. Preferably, component D comprises, preferably consists predominantly of, preferably consists essentially of, and especially preferably consists entirely of dielectrically neutral compounds, having a dielectric anisotropy in the range from −1.5 to 3. Preferably, this component comprises one or more, more preferably consists predominantly of, more preferably consists essentially of, and especially preferably consists entirely of dielectrically neutral compounds, having a dielectric anisotropy in the range from −1.5 to 3, of formula VI

VI

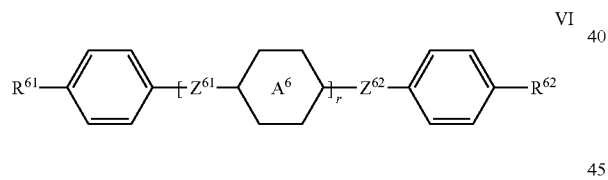

wherein $R^{61}$, and $R^{62}$, independently of each other have the meaning given for $R^2$ under formula II above, preferably $R^{61}$ is alkyl and $R^{62}$ is alkyl or alkenyl,

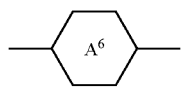

and in case it is occurring twice in each occurrence independently of each other, is

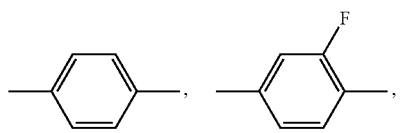

-continued

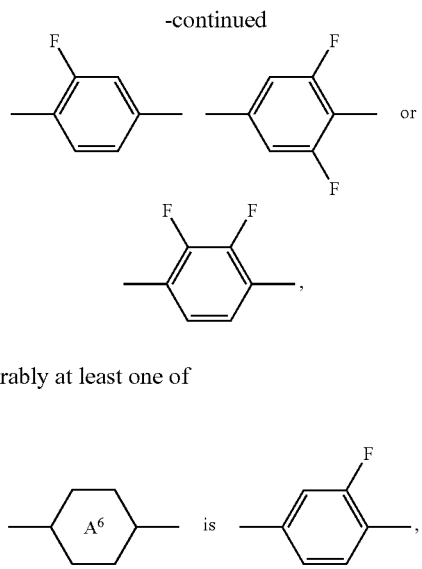

preferably at least one of

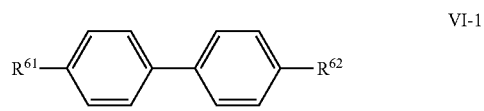

$Z^{61}$ and $Z^{62}$ are, independently of each other, and in case $Z^{61}$ is present twice, also these independently of each other, —CH$_2$CH$_2$—, —COO—, trans- —CH=CH—, trans- —CF=CF—, —CH$_2$O—, —CF$_2$O— or a single bond, preferably at least one of them is a single bond, and r is 0, 1 or 2, preferably 0 or 1.

Preferably, the dielectrically neutral component, component D, comprises one or more compounds selected from the group of compounds of formulae VI-1 and VI-2

VI-1

VI-2

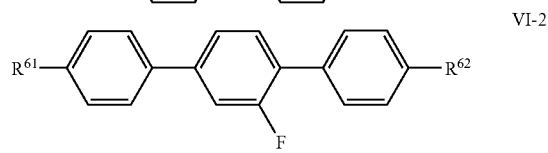

wherein $R^{61}$ and $R^{62}$ have the respective meanings given under formula VI above, and $R^{61}$ preferably is alkyl, and in formula VI-1 $R^{62}$ preferably is alkenyl, preferably —(CH$_2$)$_2$—CH=CH—CH$_3$, and in formula VI-2 $R^{62}$ preferably is alkyl.

Preferably, the dielectrically neutral component, component D, comprises one or more compounds selected from the group of compounds of formulae VI-1 and VI-2 wherein preferably $R^{61}$ is n-alkyl and in formula VI-1 $R^{62}$ preferably is alkenyl and in formula VI-2 $R^{62}$ preferably is n-alkyl.

Preferably, the liquid crystal mixtures according to the present invention do contain at least one further component besides components A and B. This third component may be either one of components C and D, preferably the third component present is component C.

Obviously the mixtures according to the present invention also can contain all four components A, B, C and D.

Additionally, the liquid crystal mixtures according to the present invention may comprise a further optional component, component E, which has a negative dielectric anisotropy and comprises, preferably predominantly consists of, more preferably essentially consists of, and most preferably entirely consists of dielectrically negative compounds preferably of formula VII

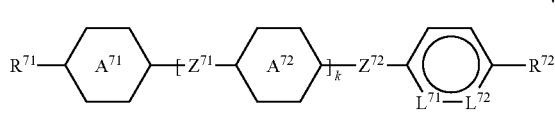

VII wherein
$R^{71}$ and $R^{72}$ independently of each other have the meaning given for $R^2$ under formula II above,

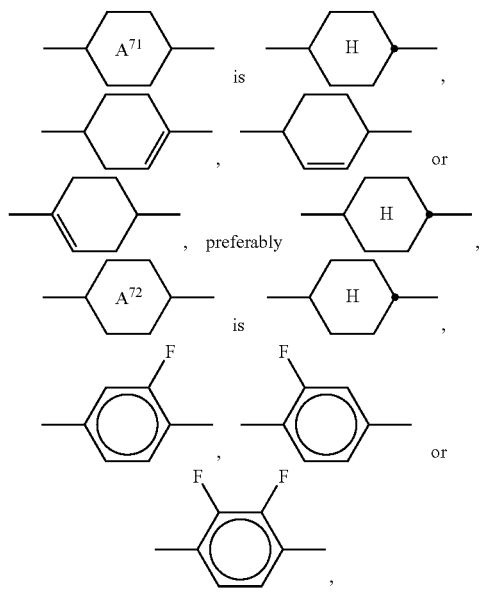

$Z^{71}$ and $Z^{72}$ are, independently of each other, —CH$_2$CH$_2$—, —COO—, trans- CH═CH—, trans- —CF═CF—, —CH$_2$O—, —CF$_2$O— or a single bond, preferably at least one of them is a single bond and most preferably both are a single bond,
$L^{71}$ and $L^{72}$ are, independently of each other, C—F or N, preferably at least one of them is C—F and most preferably both of them are C—F and
k is 0 or 1.

Preferably, the liquid crystalline media according to the instant invention comprise, preferably predominantly consist of, more preferably consists essentially of, and most preferably entirely consist of components A to E and in particular of compounds selected from the group of compounds of formulae I to VII.

Comprising in this application means in the context of compositions that the entity referred to, e.g., the medium or the component, contains the component or components or of the compound or compounds in question, preferably in a total concentration of 10% or more and most preferably of 20% or more.

Predominantly consisting of, in this context, means that the entity referred to contains 55% or more, preferably 60% or more and most preferably 70% or more of the component or components or of the compound or compounds in question.

Essentially consisting of, in this context, means that the entity referred to contains 80% or more, preferably 90% or more and most preferably 95% or more of the component or components or of the compound or compounds in question.

Entirely consisting of, in this context, means that the entity referred to contains 98% or more, preferably 99% or more and most preferably 100.0% of the component or components or of the compound or compounds in question.

Component E preferably comprises, preferably predominantly consists of and most preferably entirely consists of one or more compounds of formula VII, preferably selected from the group of compounds of formulae VII-1 to VII-3

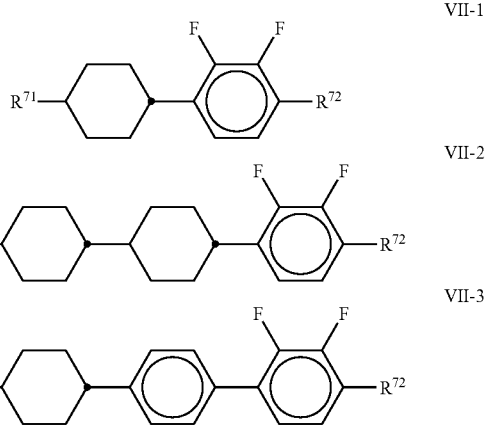

wherein
$R^{71}$ and $R^{72}$ have the respective meanings given under formula VI above.

In formulae VII-1 to VII-3, $R^{71}$ preferably is n-alkyl or 1-E-alkenyl and $R^{72}$ preferably is n-alkyl or alkoxy.

Also other mesogenic compounds, which are not explicitly mentioned above, can optionally and beneficially be used in the media according to the instant invention. Such compounds are known to the expert in the field.

The liquid crystal media according to the instant invention are generally characterized by a clearing point of 60° C. or more, preferably of 70° C. or more, more preferably of 75° C. or more, and in particular of 80° C. or more.

The Δn, at 589 nm (Na$^D$) and 20° C., of the liquid crystal media according to the instant invention preferably is in the range of 0.060 or more to 0.160 or less, more preferably in the range of 0.070 or more to 0.125 or less, and most preferably in the range of 0.080 or more to 0.115 or less.

The Δ∈, at 1 kHz and 20° C., of the liquid crystal medium according to the invention preferably is 3.0 or more, more preferably is 4.0 or more.

Preferably, the nematic phase of the inventive media extends at least from 0° C. or less to 70° C. more, more preferably at least from –20° C. or less to 70° C. more, most preferably at least from –30° C. or less to 75° C. more, and in particular at least from –40° C. or less to 75° C. more.

In a first preferred embodiment of the present invention the Δn of the liquid crystal media is in the range of 0.110 or more to 0.140 or less, more preferably in the range of 0.115 or more to 0.135 or less, and most preferably in the range of 0.120 or more to 0.130 or less, whereas Δ∈ preferably is in the range from 4.0 or more to 7.0 or less. In this embodiment the media preferably comprise one or more compounds of formula II and/or of formula III-2f and/or they preferably do not contain biphenyl compounds with a terminal CF$_3$ group or a terminal OCF$_3$ group and/or have a clearing point of 60° C. or more.

In a second preferred embodiment of the present invention the Δn of the liquid crystal media is in the range of 0.085 or more to 0.125 or less, more preferably in the range of 0.090 or more to 0.120 or less, and most preferably in the range of 0.095 or more to 0.115 or less, whereas Δε preferably is 5.0 or more, preferably is 6.0 or more, more preferably 7.0 or more, even more preferably 8.0 or more, and most preferably in the range from 5.0 or more to 12.0 or less.

In this embodiment preferably the nematic phase of the inventive media extends at least from −20° C. or less to 70° C. more, more preferably at least from −20° C. or less to 70° C. more, most preferably at least from −30° C. or less to 70° C. more, and in particular at least from −40° C. or less to 70° C. more.

In a third preferred embodiment of the present invention the Δn of the liquid crystal media is in the range of 0.070 or more to 0.120 or less, more preferably in the range of 0.075 or more to 0.115 or less, and most preferably in the range of 0.080 or more to 0.110 or less, whereas Δε preferably is 4.0 or more, more preferably is in the range from 4.0 or more to 14.0 or less, and most preferably either in the range from 4.0 or more to 12.0 or less or, particularly preferred in the range from 6.0 or more to 11.0 or less.

In this embodiment preferably the nematic phase of the inventive media extends at least from −20° C. or less to 75° C. more, more preferably at least from −30° C. or less to 70° C. more, most preferably at least from −30° C. or less to 75° C. more, and in particular at least from −30° C. or less to 80° C. more.

Preferably, the storage stability of the inventive media at a temperature of −20° C. in the bulk ($LTS_{bulk}$) is 120 h or more, more preferably 500 h, or more and most preferably 1,000 h or more.

More preferably the storage stability of the inventive media at a temperature of −30° C. in the bulk ($LTS_{bulk}$) is 120 h or more, more preferably 500 h or more, and most preferably 1,000 h or more.

Most preferably the storage stability of the inventive media at a temperature of −40° C. in the bulk ($LTS_{bulk}$) is 120 h or more, more preferably 250 h or more, and most preferably 500 h or more.

The storage stability of the inventive media at a temperature of −20° C., more preferably at a temperature of −30° C., and most preferably at a temperature of −40° C., in the bulk ($LTS_{cell}$) is preferably 250 h or more, more preferably 500 h, or more and most preferably 1,000 h or more.

The relative change of the concentration of PUQU-2-F after the "seed" test is preferably 15% or less, more preferably 8% or less, even more preferably 3% or less, and most preferably 0.1% or less.

The relative change of the concentration of PUQU-3-F after the "seed" test is preferably 10% or less, more preferably 5% or less, even more preferably 3% or less, and most preferably 0.1% or less.

Component A preferably is used in a concentration from 1% to 15%, more preferably from 2% to 10%, more preferably from 2% to 8%, and most preferably from 3% to 7% of the total mixture.

Component B preferably is used in a concentration from 10% to 70%, more preferably from 15% to 65, more preferably from 20% to 60%, and most preferably from 30% to 50% of the total mixture.

Component C preferably is used in a concentration from 15% to 85%, more preferably from 30% to 80%, more preferably from 35% to 70%, and most preferably from 40% to 60% of the total mixture.

Component D preferably is used in a concentration from 0% to 40%, preferably from 0% to 30%, more preferably from 0% to 20%, and most preferably from 4% to 15% of the total mixture.

Component E preferably is used in a concentration from 0% to 30%, preferably from 0% to 15%, and most preferably from 1% to 10% of the total mixture.

Optionally, the inventive media can comprise further liquid crystal compounds in order to adjust the physical properties. Such compounds are known to the expert. Their concentration in the media according to the instant invention is preferably 0% to 30%, more preferably 0% to 20% and most preferably 1% to 15%.

Preferably, the liquid crystal media contain 50% to 100%, more preferably 70% to 100% and most preferably 80% to 100% and in particular 90% to 100% totally of components A, B, C and D, preferably of components A, B and C, which, in turn, contain, preferably predominantly consist of and most preferably entirely consist of one or more of compounds of formulae I, II, III, IV, V, VI and VII, preferably of formulae I, II, III, IV, V and VI, respectively.

In the present application the term dielectrically positive means compounds or components with $\Delta\varepsilon > 3.0$, dielectrically neutral with $-1.5 \leq \Delta\varepsilon \leq 3.0$, and dielectrically negative with $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host mixture is less than 10%, the concentration is reduced to 5%. The capacities of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V; however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericksz-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties have been determined with test cells prepared at Merck KGaA, Germany. The test cells for the determination of Δ∈ had a cell gap of approximately 20 µm. The electrode was a circular ITO electrode with an area of 1.13 cm² and a guard ring. The orientation layers were lecithin for homeotropic orientation ($\epsilon_{\|}$) and polyimide AL-1054 from Japan Synthetic Rubber for homogeneous orientation ($\epsilon_{\perp}$). The capacities were determined with a frequency response analyser Solatron 1260 using a sine wave with a voltage of 0.3 $V_{rms}$. The light used in the electro-optical measurements was white light. The set up used was commercially available equipment of Autronic Melchers, Germany. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 4 to 20 and most preferably of 4 to 16 compounds. These compounds are mixed in a conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g., using so called pre-mixtures, which can be, e.g., homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

The storage stability in the bulk ($LTS_{bulk}$) of the inventive media at a given temperature T is determined by visual inspection. 2 g of the media of interest are filled into a closed glass vessel (bottle) of appropriate size placed in a refrigerator at a predetermined temperature. The bottles are checked every 24 h for the occurrence of smectic phases and of crystallisation. For every material and at each temperature two bottles are stored. If a crystallisation or the appearance of a smectic phase is observed in at least one of the two correspondent bottles the test is terminated and the time of the last inspection before the one at which the occurrence of a higher ordered phase is observed is recorded as the respective storage stability.

For the determination of the storage stability in LC cells ($LTS_{cell}$) of the inventive media at a given temperature T, the media are filled into TN-type LC test cells with a orientation layers and having an approximate surface area of 3 cm², an electrode area of about 3 cm² and a cell gap of 6 µm. The cells have no spacers in the area covered by the LC. Only in the edge seal spacers are used. The cells are sealed, polarizers are attached to the cells and the cells are and placed in a cold box with a window and internal lighting at a predetermined temperature refrigerator. Generally three cells each are filled with a given LC for each temperature investigated. The cells inside the cool box are inspected visually through a window every 24 h for the occurrence of smectic phases and of crystallization. Here too, the time of the last inspection before the one at which the occurrence of a higher ordered phase is observed in the first one of a given set of test cells is recorded as the respective storage stability.

For the so called "seed" test 1 g each of the respective mixtures of interest are kept at a temperature of 20° C. in bulk and subsequently doped with a tiny seed crystal of PUQU-2-F (1 to 10 mg), stored for 96 h at a temperature of 20° C. Then the sample is investigated by visual inspection whether the volume of the crystal has increased or whether it has been unchanged or even decreased. Then the remaining nematic liquid crystalline mixture is analyzed by GC-MS and its composition is compared to that of the respective bulk material prior to doping.

Preferably, the liquid crystalline media according to the instant invention comprise, one or more compounds of formula Ia-4 and/or one or more compounds of formula II, preferably of formula II-2 and most preferably selected from the group of sub-formulae II-2a-2 and II-2d-1 and/or one or more compounds of formula III, preferably of formula III-2 and most preferably selected from the group of sub-formulae III-2f-3, III-2f-4 and III-2f-5 and/or one or more compounds of formula IV-1, preferably of sub-formula IV-1b and/or one or more compounds of formula VI, preferably of sub-formulae VI-2.

The entire disclosures of all applications, patents and publications, cited herein and of corresponding European application No. 06005479.8, filed Mar. 17, 2006, are incorporated by reference herein.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n and m C-atoms, respectively. The interpretation of table B is self-evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| $nCF_3$ | $C_nH_{2n+1}$ | $CF_3$ | H | H |
| $nCF_3.F$ | $C_nH_{2n+1}$ | $CF_3$ | H | F |
| $nCF_3.F.F$ | $C_nH_{2n+1}$ | $CF_3$ | F | F |
| $nOCF_3$ | $C_nH_{2n+1}$ | $OCF_3$ | H | H |
| $nOCF_3.F$ | $C_nH_{2n+1}$ | $OCF_3$ | H | F |
| $nOCF_3.F.F$ | $C_nH_{2n+1}$ | $OCF_3$ | F | F |
| $nOCF_2$ | $C_nH_{2n+1}$ | $OCHF_2$ | H | H |
| $nOCF_2.F$ | $C_nH_{2n+1}$ | $OCHF_2$ | H | F |
| $nOCF_2.F.F$ | $C_nH_{2n+1}$ | $OCHF_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |

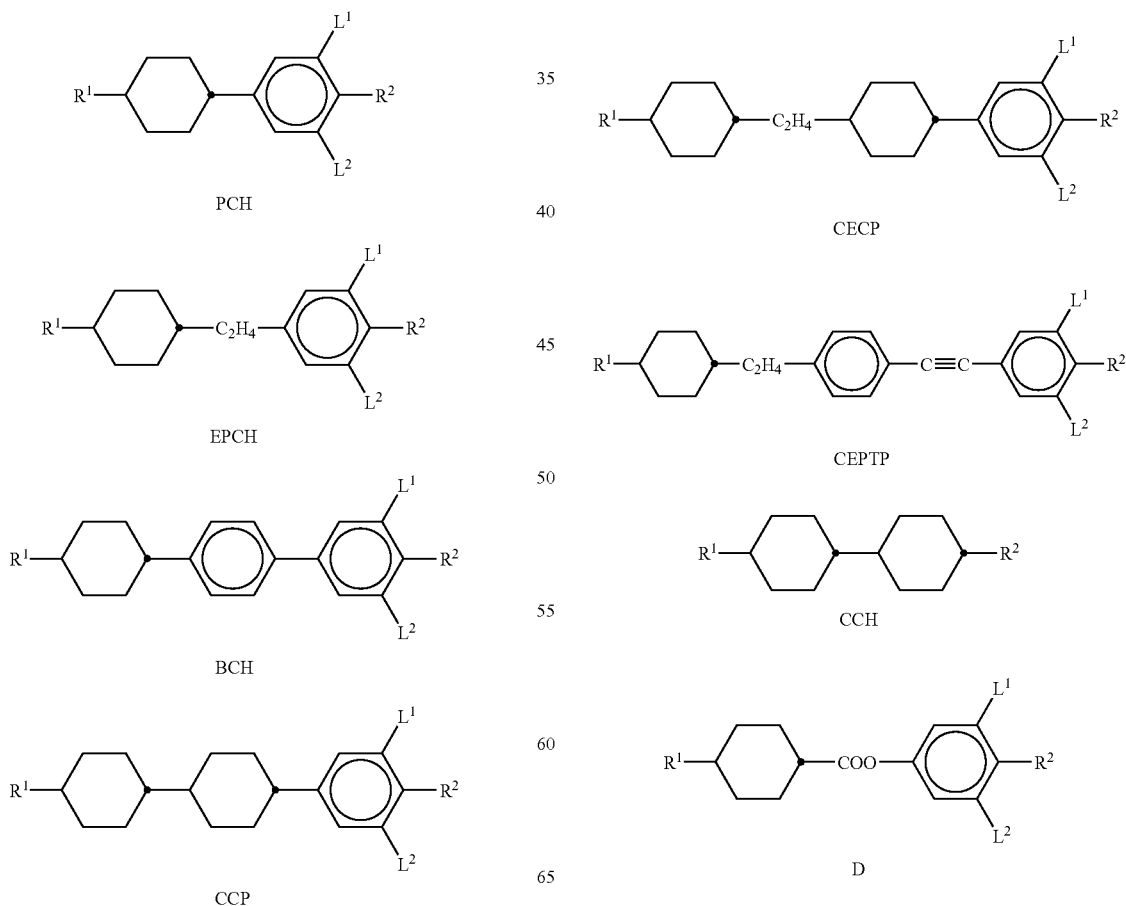

TABLE A

PCH

EPCH

BCH

CCP

TABLE A-continued

EBCH

BECH

ECCP

CECP

CEPTP

CCH

D

TABLE A-continued
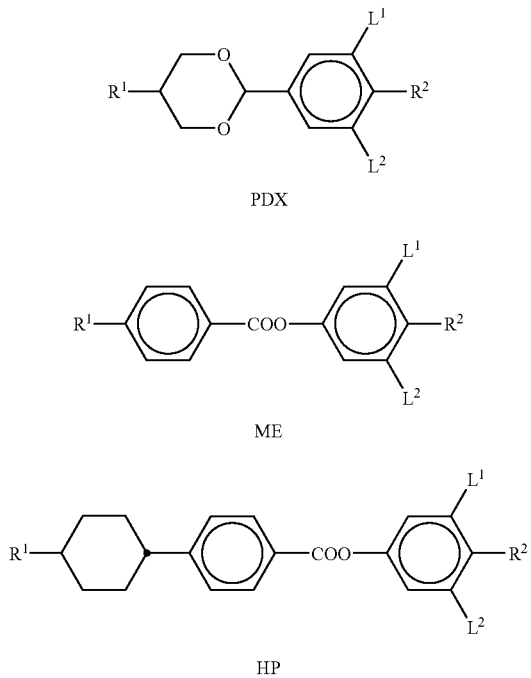
PDX
ME
HP
TABLE A-continued
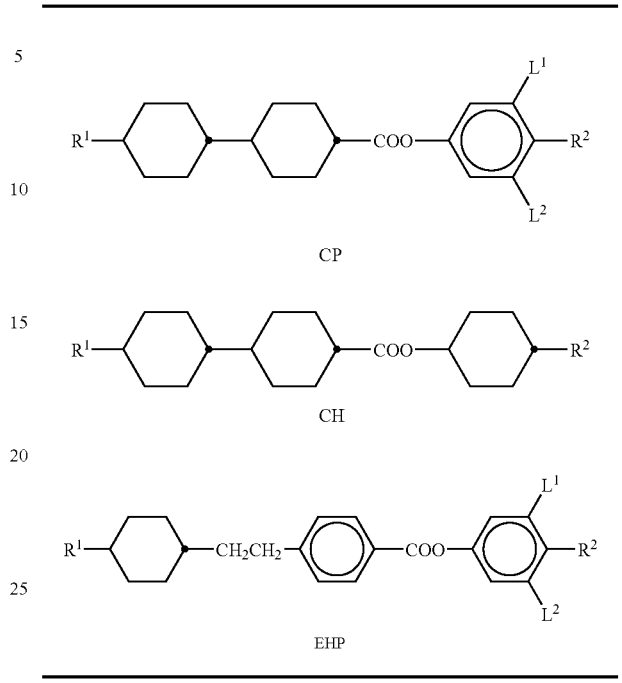
CP
CH
EHP
TABLE B
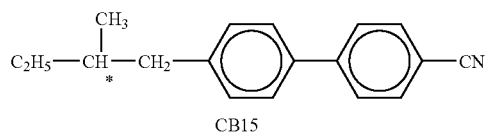
CB15
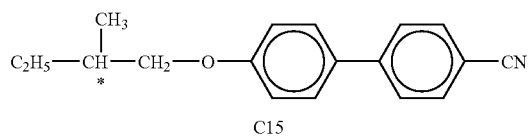
C15
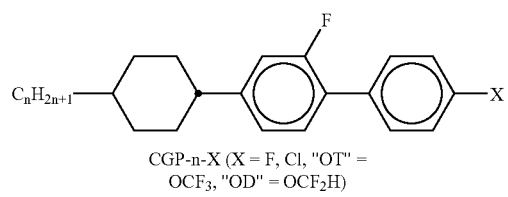
CGP-n-X (X = F, Cl, "OT" = OCF$_3$, "OD" = OCF$_2$H)
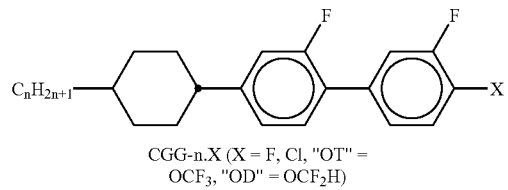
CGG-n.X (X = F, Cl, "OT" = OCF$_3$, "OD" = OCF$_2$H)

TABLE B-continued
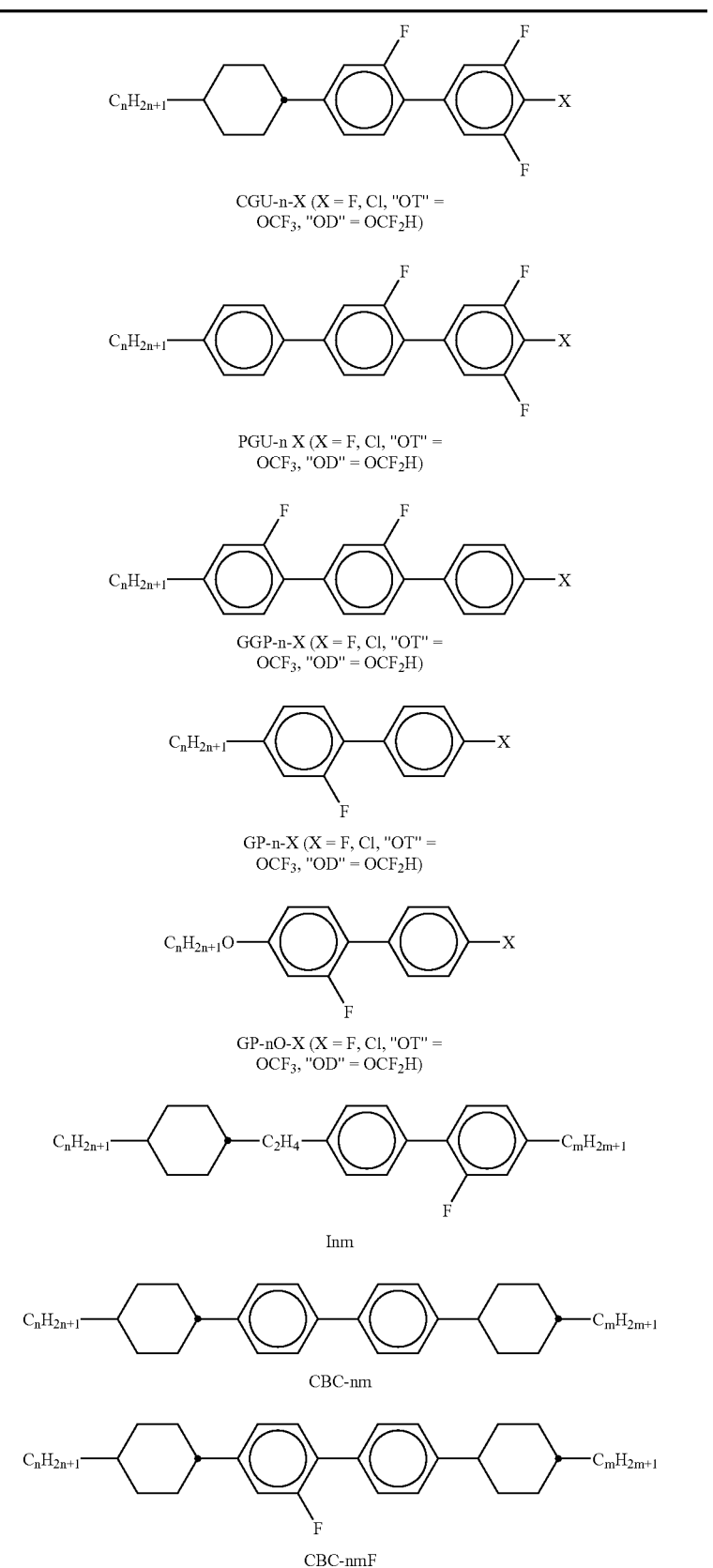

TABLE B-continued
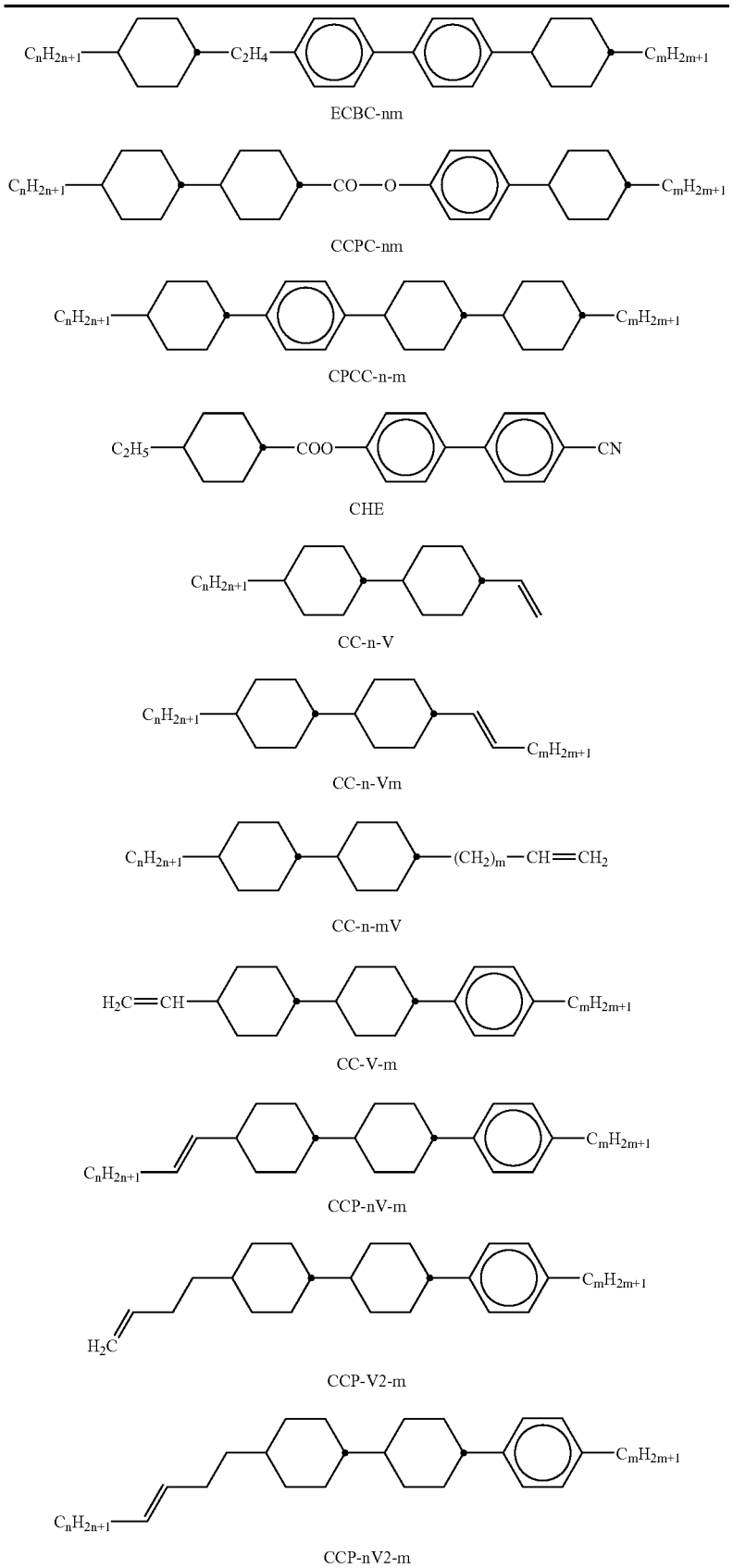

TABLE B-continued
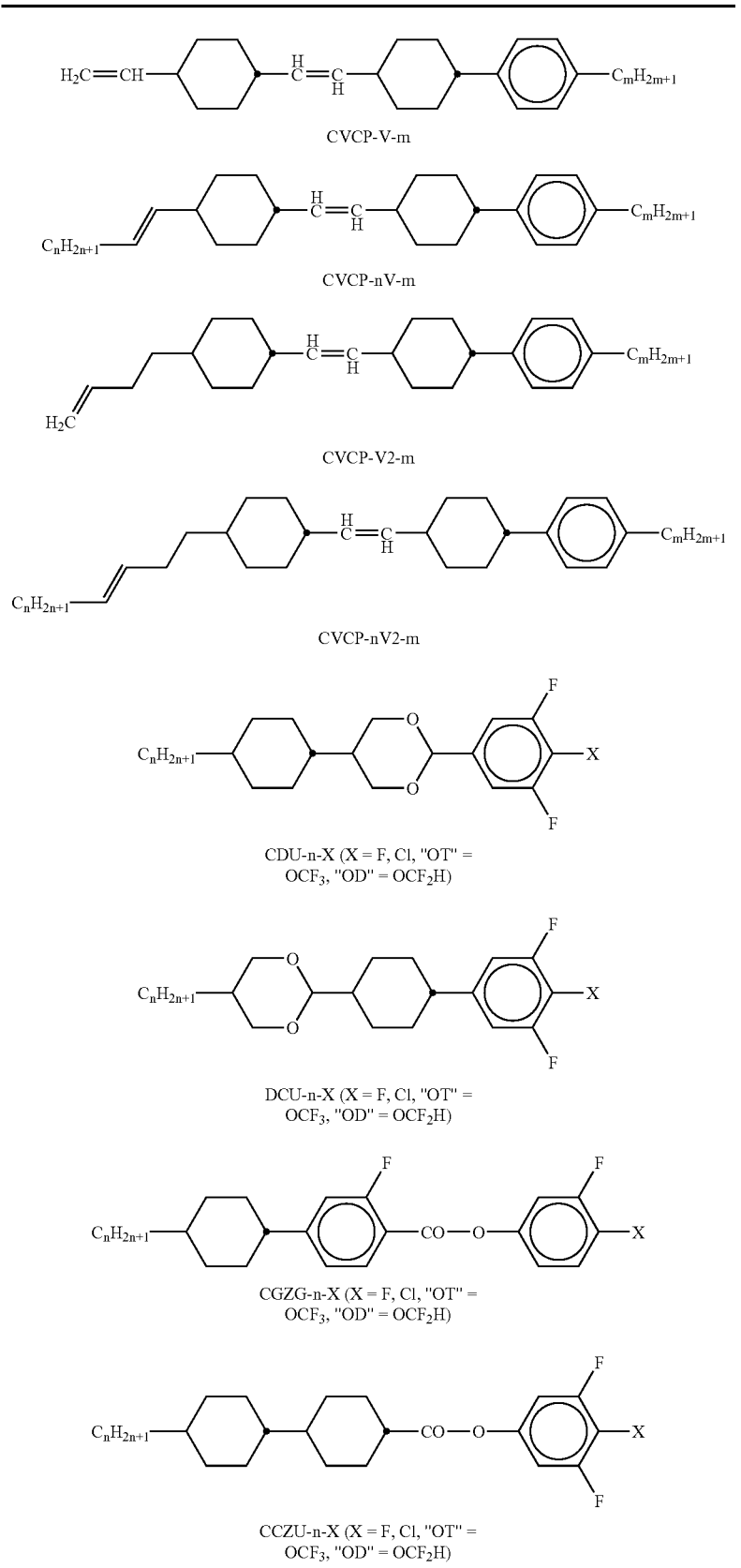

TABLE B-continued
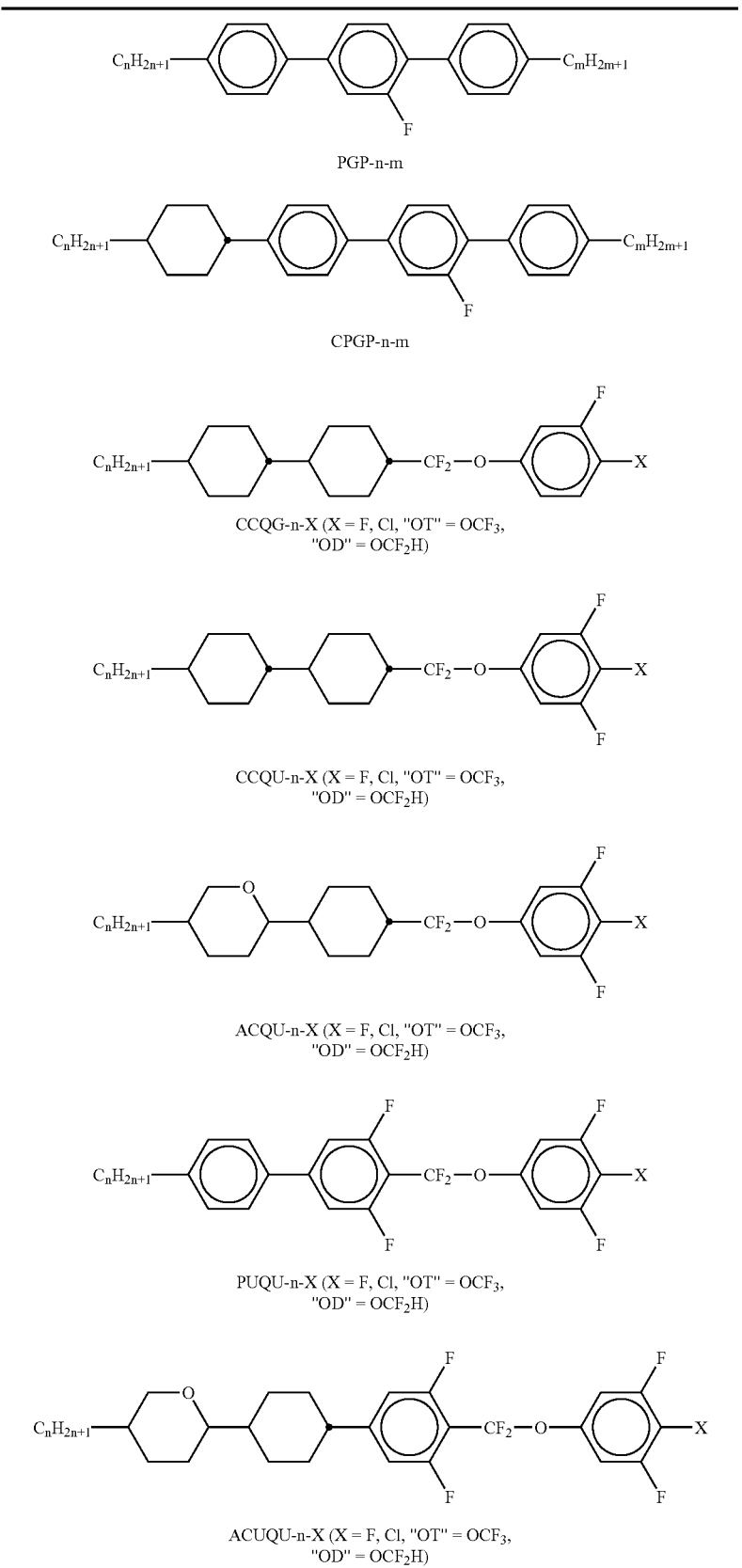

TABLE B-continued
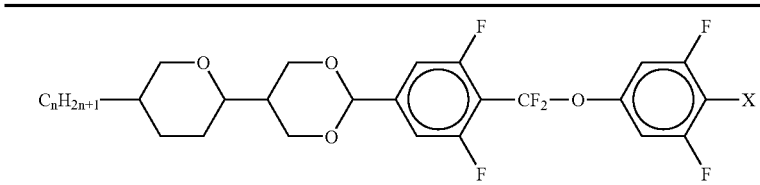
ADUQU-n-X (X = F, Cl, "OT" = OCF$_3$, "OD" = OCF$_2$H)
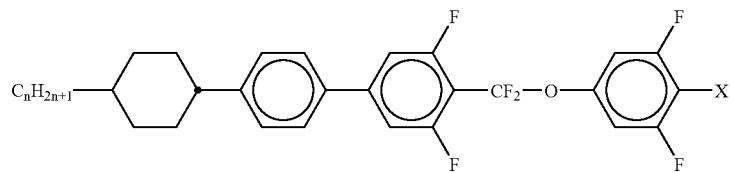
CPUQU-n-X (X = F, Cl, "OT" = OCF$_3$, "OD" = OCF$_2$H)
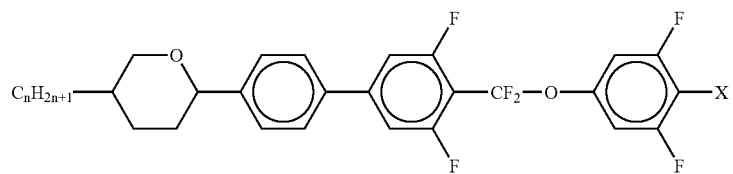
APUQU-n-X (X = F, Cl, "OT" = OCF$_3$, "OD" = OCF$_2$H)
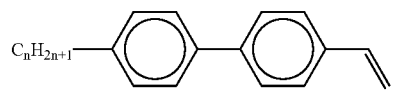
PP-n-V
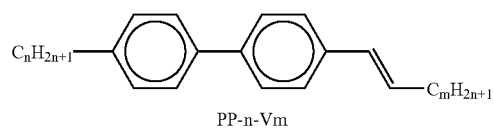
PP-n-Vm
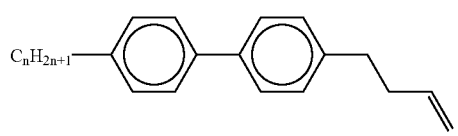
PP-n-2V
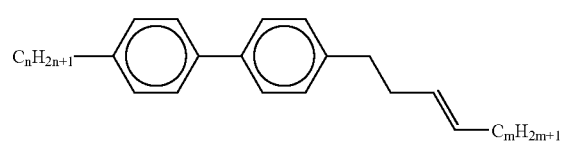
PP-n-2Vm
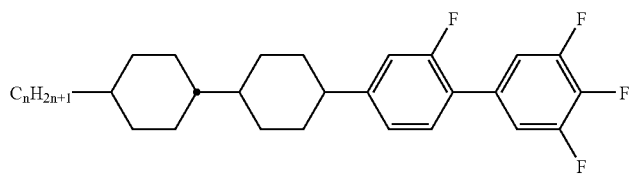
CCGU-n-F The liquid crystal media according to the instant invention contain preferably

- seven or more, preferably eight or more compounds, preferably of different formulae, selected from the group of compounds of tables A and B and/or
- one or more, more preferably two or more, preferably three or more compounds, preferably of different formulae, selected from the group of compounds of table A and/or
- three or more, more preferably four or more compounds, more preferably five or more compounds, preferably of different formulae, selected from the group of compounds of table B.

EXAMPLES

The examples given in the following are illustrating the present invention without limiting it in any way.

However, the physical properties compositions illustrate to the expert, which properties can be achieved and in which ranges they can be modified. Especially the combination of the various properties, which can be preferably achieved, is thus well defined for the expert.

Example 1

A liquid crystal mixture is realized with the composition and properties given in the following table.

| No. | Composition Compound Abbreviation | Conc./% |
|---|---|---|
| 1 | GGP-3-CL | 6.0 |
| 2 | PGU-2-F | 5.0 |
| 3 | PGU-3-F | 5.0 |
| 4 | PUQU-3-F | 6.0 |
| 5 | CC-3-V | 33.0 |
| 6 | CC-3-V1 | 9.0 |
| 7 | CCP-V-1 | 19.0 |
| 8 | PGP-2-3 | 7.0 |
| 9 | PGP-2-4 | 7.0 |
| 10 | GP-2-CL | 3.0 |
| Σ | | 100.0 |

| Physical Properties | |
|---|---|
| T (N, I) = | 74.0° C. |
| $n_e$ (20° C., 589.3 nm) = | 1.6207 |
| Δn (20° C., 589.3 nm) = | 0.1238 |
| $\epsilon_\parallel$ (20° C., 1 kHz) = | 7.1 |
| Δε (20° C., 1 kHz) = | 4.0 |
| $\gamma_1$ (20° C.) = | 54 mPa·s |
| $LTS_{bulk}$ (−20° C.) = | 1.000 h |
| $LTS_{bulk}$ (−30° C.) = | 576 h |
| $V_{10}$ (20° C.) = | 2.06 V |
| $V_{90}$ (20° C.) = | 3.05 V |

This mixture has favourable physical properties, e.g., of Δn, characteristic voltages and a moderately low rotational viscosity. Thus, it is equally well suited for displays operating in the TN mode. It further has an excellent stability in the nematic phase at a temperature of −30° C.

Comparative Example 2

A liquid crystal host mixture is realized with the composition and properties given in the following table.

| No. | Composition Compound Abbreviation | Conc./% |
|---|---|---|
| 1 | PUQU-2-F | 7.0 |
| 2 | PUQU-3-F | 15.0 |
| 3 | CC-3-V | 55.0 |
| 4 | PGP-2-3 | 4.0 |
| 5 | PGP-2-4 | 3.0 |
| 6 | CBC-33 | 3.0 |
| 7 | CBC-33F | 4.0 |
| 8 | CBC-53 | 3.0 |
| 9 | CBC-53F | 3.0 |
| 10 | CBC-55F | 3.0 |
| Σ | | 100.0 |

| Physical Properties | |
|---|---|
| T (N, I) = | 74.7° C. |
| $n_e$ (20° C., 589.3 nm) = | 1.5844 |
| Δn (20° C., 589.3 nm) = | 0.0989 |
| $\epsilon_\parallel$ (20° C., 1 kHz) = | 7.7 |
| Δε (20° C., 1 kHz) = | 4.7 |
| $\gamma_1$ (20° C.) = | 67 mPa·s |
| $V_{10}$ (20° C.) = | 1.90 V |
| $V_{90}$ (20° C.) = | 2.78 V |

This mixture in bulk is kept at a temperature of 20° C. and doped with a tiny seed crystal of PUQU-2° F., stored for 96 h at a temperature of 20° C. and then the remaining nematic liquid crystalline mixture analyzed by GC-MS.

The results are shown for comparison in the following table together with those of example 2

Example 2

Examples 2.1 and 2.2

To the mixture of comparative example 2, alternatively 2% and 5% of GP-2-CL are added, and the respective mixtures are examined.

The results are shown in the following table.

| | | Example | | |
|---|---|---|---|---|
| | Compound | Compar. Ex. 2 | 2.1 | 2.2 |
| | | Composition Change | | |
| No. | Abbreviation | Conc./Conc.$_0$ | | |
| 1 | PUQU-2-F | 0.88 | 0.97 | 1.00 |
| 2 | PUQU-3-F | 0.95 | 0.99 | 1.00 |
| 3 | CC-3-V | 1.01 | 1.00 | 1.00 |
| 4 | PGP-2-3 | 1.02 | 1.01 | 1.00 |
| 5 | PGP-2-4 | 1.02 | 1.01 | 1.00 |
| 6 | CBC-33 | 1.02 | 1.01 | 1.00 |
| 7 | CBC-33F | 1.02 | 1.01 | 1.00 |
| 8 | CBC-53 | 1.02 | 1.01 | 1.00 |
| 9 | CBC-53F | 1.02 | 1.01 | 1.00 |
| 10 | CBC-55F | 1.02 | 1.01 | 1.00 |
| 11 | GP-2-CL | n.p. | 1.00 | 1.00 |

Remark:
n.p.: not present

Comparative Example 3

A liquid crystal host mixture is realized with the composition and properties given in the following table

| | Composition Compound | |
|---|---|---|
| No. | Abbreviation | Conc./% |
| 1 | GGP-3-CL | 1.5 |
| 2 | PUQU-2-F | 11.0 |
| 3 | PUQU-3-F | 11.0 |
| 4 | CGU-2-F | 3.0 |
| 5 | CCGU-3-F | 6.0 |
| 6 | CCZU-3-F | 12.0 |
| 7 | CCQU-3-F | 6.0 |
| 8 | CC-3-V1 | 11.0 |
| 9 | CC-5-V | 16.5 |
| 10 | CCP-V-1 | 12.0 |
| 11 | CCP-V2-1 | 10.0 |
| Σ | | 100.0 |

| Physical Properties | |
|---|---|
| T (N, I) = | 90.1° C. |
| $n_e$ (20° C., 589.3 nm) = | 1.5830 |
| Δn (20° C., 589.3 nm) = | 0.0999 |
| $\epsilon_\parallel$ (20° C., 1 kHz) = | 13.6 |
| Δε (20° C., 1 kHz) = | 10.0 |
| $\gamma_1$ (20° C.) = | 100 mPa · s |
| ν (20° C.) = | 15 mm$^2$s$^{-1}$ |
| ν (−20° C.) = | 210 mm$^2$s$^{-1}$ |
| ν (−30° C.) = | 4.000 mm$^2$s$^{-1}$ |

This mixture in bulk is kept at a temperature of 20° C. and doped with a tiny seed crystal of PUQU-2-F, stored for 96 h at a temperature of 20° C. and then the remaining nematic liquid crystalline mixture analyzed by GC-MS.

The results are shown for comparison in the following table together with those of example 3.

Example 3

Examples 3.1 and 3.2

To the mixture of comparative example, alternatively 2% and 5% of GP-2-CL are added, and the respective mixtures are examined.

The results are shown in the following table.

| Compound | | Example | | |
|---|---|---|---|---|
| | | Compar. Ex. 3 | 3.1 | 3.2 |
| | | Composition Change | | |
| No. | Abbreviation | Conc./Conc.$_0$ | | |
| 1 | GGP-3-CL | 1.05 | 1.03 | 1.01 |
| 2 | PUQU-2-F | 0.70 | 0.80 | 0.94 |
| 3 | PUQU-3-F | 0.86 | 0.91 | 0.98 |
| 4 | CGU-2-F | 1.04 | 1.03 | 1.01 |
| 5 | CCGU-3-F | 1.05 | 1.03 | 1.01 |
| 6 | CCZU-3-F | 1.05 | 1.03 | 1.01 |
| 7 | CCQU-3-F | 1.04 | 1.03 | 1.01 |
| 8 | CC-3-V1 | 1.04 | 1.03 | 1.01 |
| 9 | CC-5-V | 1.04 | 1.03 | 1.01 |
| 10 | CCP-V-1 | 1.05 | 1.03 | 1.01 |
| 11 | CCP-V2-1 | 1.05 | 1.03 | 1.01 |
| 12 | GP-2-CL | n.p. | 1.03 | 1.01 |

Remark:
n.p.: not present

Example 4

A liquid crystal mixture is realized with the composition and properties given in the following table.

| | Composition Compound | |
|---|---|---|
| No. | Abbreviation | Conc./% |
| 1 | APUQU-2-F | 8.0 |
| 2 | PGU-2-F | 7.0 |
| 3 | PUQU-2-F | 7.0 |
| 4 | PUQU-3-F | 8.0 |
| 5 | CDU-2-F | 5.0 |
| 6 | CC-3-V | 26.0 |
| 7 | CC-3-V1 | 12.5 |
| 8 | CCP-V-1 | 12.0 |
| 9 | CCP-V2-1 | 12.5 |
| 10 | GP-2-CL | 2.0 |
| Σ | | 100.0 |

| Physical Properties | |
|---|---|
| T (N, I) = | 73.0° C. |
| $n_e$ (20° C., 589.3 nm) = | 1.5856 |
| Δn (20° C., 589.3 nm) = | 0.0989 |
| $\epsilon_\parallel$ (20° C., 1 kHz) = | 12.0 |
| Δε (20° C., 1 kHz) = | 8.50 |
| $\gamma_1$ (20° C.) = | 63 mPa · s |
| $k_1$ (20° C.) = | 11.7 pN |
| $k_3/k_1$ (20° C.) = | 1.14 |
| LTS$_{cell}$ (−20° C.) = | 1.000 h |
| LTS$_{cell}$ (−30° C.) = | 1.000 h |
| $V_0$ (20° C.) = | 1.24 V |

This mixture has a favourably low value of Δn, a high value of Δε and a low rotational viscosity. Thus it is very well suited for displays operating in the IPS mode. It further has a good stability of the nematic phase at deep temperatures.

Example 5

A liquid crystal mixture is realized with the composition and properties given in the following table.

| | Composition Compound | |
|---|---|---|
| No. | Abbreviation | Conc./% |
| 1 | APUQU-2-F | 9.0 |
| 2 | PGU-2-F | 8.0 |
| 3 | PUQU-3-F | 19.5 |

-continued

| | | |
|---|---|---|
| 4 | CCP-2OCF3 | 2.0 |
| 5 | CCP-3OCF3 | 8.0 |
| 6 | CDU-2-F | 1.5 |
| 7 | CC-3-V | 15.0 |
| 8 | CC-3-V1 | 12.0 |
| 9 | CCP-V-1 | 12.0 |
| 10 | CCP-V2-1 | 11.0 |
| 11 | GP-2-CL | 2.0 |
| Σ | | 100.0 |

| Physical Properties | |
|---|---|
| T (N, I) = | 79.0°C. |
| $n_e$ (20° C., 589.3 nm) = | 1.5965 |
| Δn (20° C., 589.3 nm) = | 0.1096 |
| $\epsilon_{\parallel}$ (20° C., 1 kHz) = | 14.7 |
| Δε (20° C., 1 kHz) = | 11.0 |
| $\gamma_1$ (20° C.) = | 80 mPa·s |
| $k_1$ (20° C.) = | 12.5 pN |
| $k_3/k_1$ (20° C.) = | 1.12 |
| $LTS_{cell}$ (−20° C.) = | 1.000 h |
| $LTS_{cell}$ (−30° C.) = | 1.000 h |
| $V_0$ (20° C.) = | 1.12 V |

This mixture has a favourably low value of Δn, a high value of Δε and a low rotational viscosity. Thus it is very well suited for displays operating in the IPS mode. It further has a good stability of the nematic phase at deep temperatures.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof can make various changes and modifications of the invention to adapt it to various usages and conditions.

The invention claimed is:

1. A liquid crystal medium comprising:
a first dielectrically positive component, component A, comprising at least one dielectrically positive compound of the formula

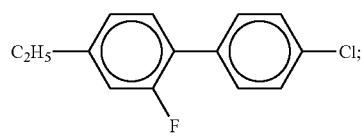

a second dielectrically positive component, component B, comprising one or more dielectrically positive compounds having a dielectric anisotropy of more than 3; and
optionally a dielectrically neutral component, component C, comprising one or more dielectrically neutral compounds having a dielectric anisotropy of −1.5 to 3;
wherein component B comprises one or more compounds selected from formulae III-1a-1 to III-1a-6, optionally one or more compounds of formula III-2, and optionally one or more compounds of formula II

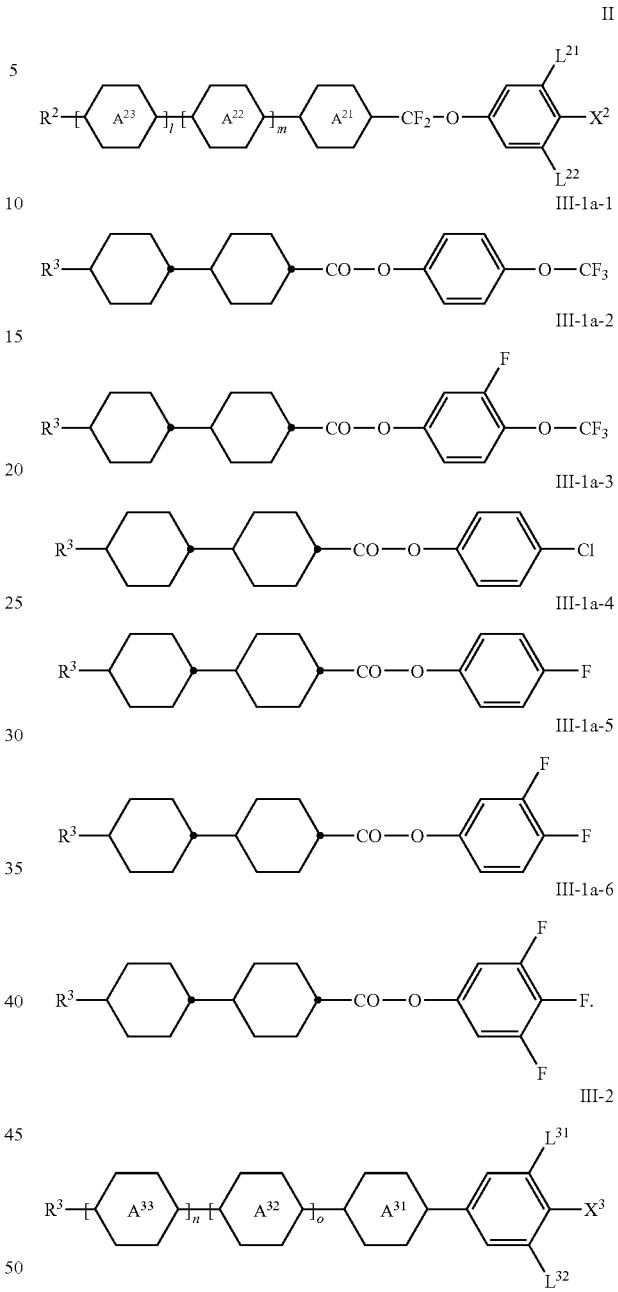

wherein $R^2$ and $R^3$ are, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms, or fluorinated alkenyl having 2 to 7 C-atoms,

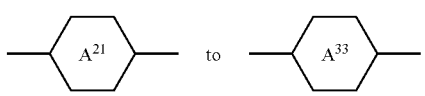

are, independently of each other,

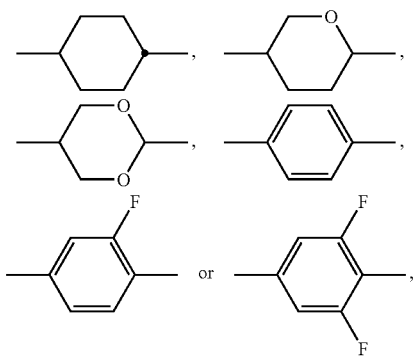

$L^{21}$, $L^{22}$, $L^{31}$ and $L^{32}$ are, independently of each other, H or F, $X^2$ and $X^3$ are, independently of each other, halogen, halogenated alkyl having 1 to 3 C-atoms, halogenated alkoxy having 1 to 3 C-atoms, halogenated alkenyl having 2 to 3 C-atoms, or alkenyloxy having 2 or 3 C-atoms, and l, m, n and o are, independently of each other, 0 or 1.

2. A liquid crystal medium according to claim 1, wherein the concentration of component A in the medium is 0.1% to 20%.

3. A liquid crystal medium according to claim 1, wherein component B comprises one or more compounds of formula II.

4. A liquid crystal medium according to claim 1, wherein said medium further said dielectrically neutral component, component C, and component C comprises one or more dielectrically neutral compounds of formula IV

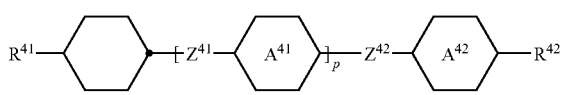

IV wherein $R^{41}$ and $R^{42}$, are, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms, or fluorinated alkenyl having 2 to 7 C-atoms,

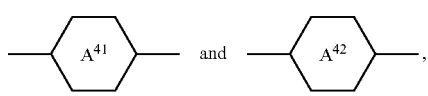

independently of each other, and in case

is present twice, also these, independently of each other, are

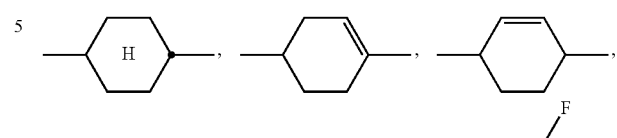

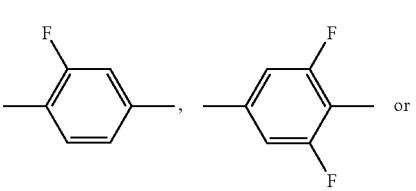

$Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond, and p is 0, 1 or 2.

5. A liquid crystal medium according to claim 1, wherein said medium further comprises an additional dielectrically neutral component, component D having a dielectric anisotropy in the range from −1.5 to 3, and component D comprises one or more dielectrically neutral compounds, having a dielectric anisotropy in the range from −1.5 to 3, of formula VI

VI wherein $R^{61}$ and $R^{62}$, independently of each other are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms, or fluorinated alkenyl having 2 to 7 C-atoms,

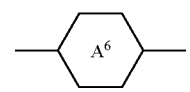

and in case it is occurring twice in each occurrence independently of each other, is

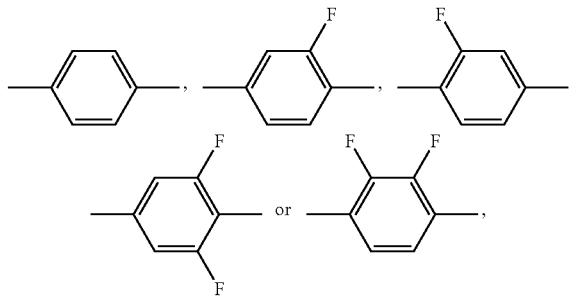

$Z^{61}$ and $Z^{62}$ are, independently of each other, and in case $Z^{61}$ is present twice, also these independently of each other, —CH$_2$CH$_2$—, —COO—, trans- —CH=CH—, trans- —CF=CF—, —CH$_2$O—, —CF$_2$O— or a single bond, and r is 0, 1 or 2.

6. A liquid crystal medium according to claim 3, wherein said one or more compounds of formula II are selected from formulae II-1 and II-2

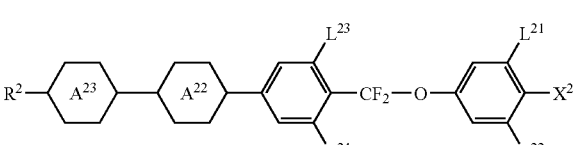

II-1

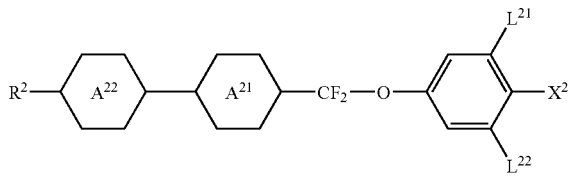

II-2 wherein $L^{21}$, $L^{22}$, $L^{23}$ and $L^{24}$ are, independently, H or F.

7. A liquid crystal medium according to claim 6, wherein $L^{21}$ and $L^{22}$ are each F, $L^{23}$ and $L^{24}$ are each F, or $L^{21}$, $L^{22}$, $L^{23}$ and $L^{24}$ are all F.

8. A liquid crystal medium according to claim 6, wherein component B comprises one or more compounds of formula II-1, and said one or more compounds of formula II-1 are selected from the compounds of formulae II-1a to II-1i

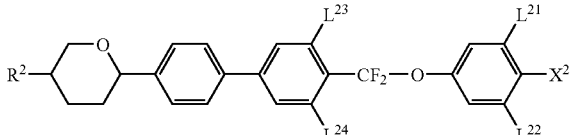

II-1a

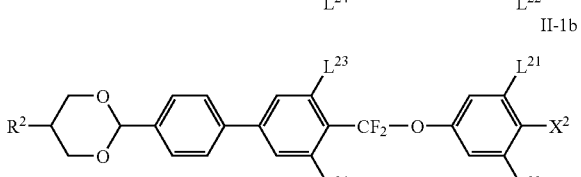

II-1b

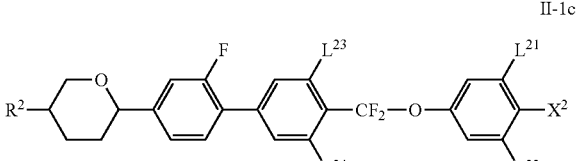

II-1c

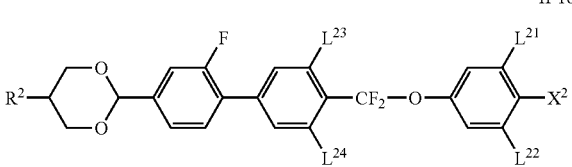

II-1d

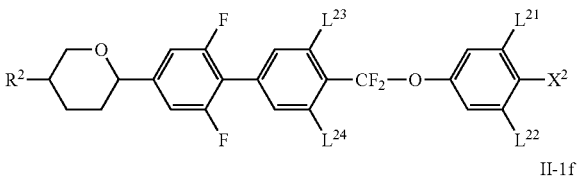

II-1e

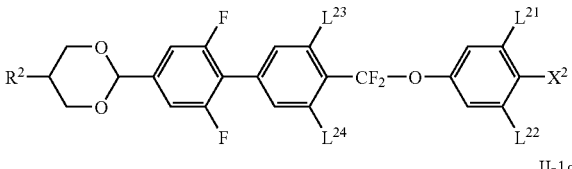

II-1f

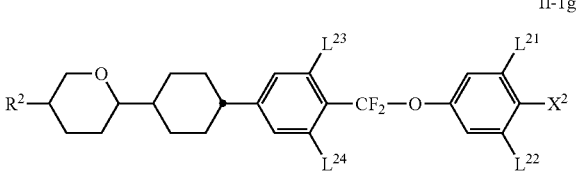

II-1g

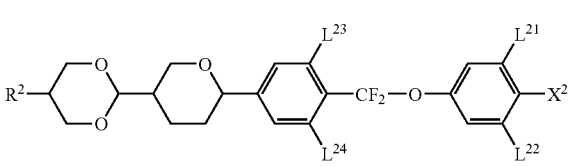

II-1h

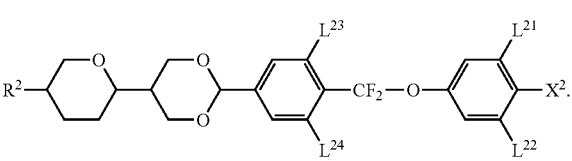

II-1i

9. A liquid crystal medium according to claim 8, wherein $L^{21}$ and $L^{22}$ are each F, $L^{23}$ and $L^{24}$ are each F, or $L^{21}$, $L^{22}$, $L^{23}$ and $L^{24}$ are all F.

10. A liquid crystal medium according to claim 6, wherein component B comprises one or more compounds of formula II-2, and said one or more compounds of formula II-2 are selected from the compounds of formulae II-2a to II-2d

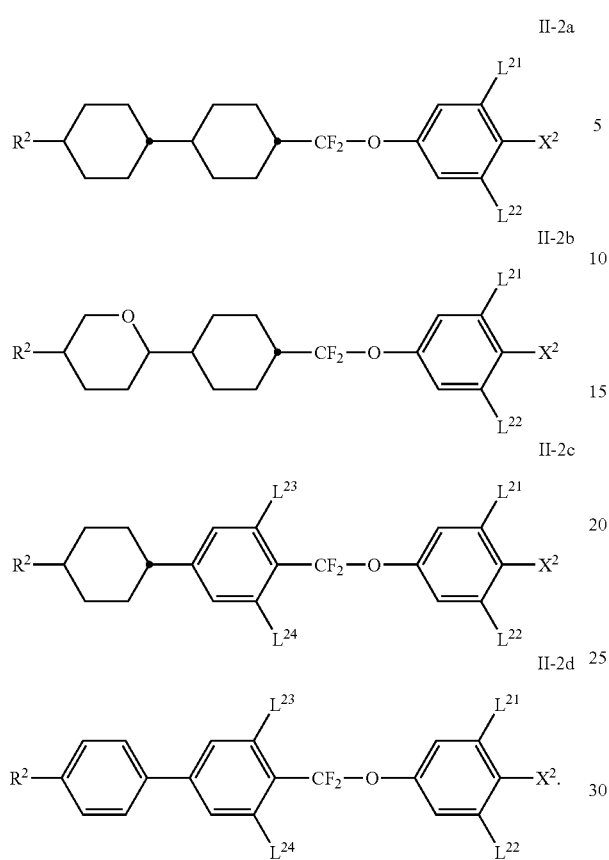

11. A liquid crystal medium according to claim 10, wherein $L^{21}$ and $L^{22}$ are both F and $L^{23}$ and $L^{24}$ are both H, or $L^{21}$, $L^{22}$, $L^{23}$ and $L^{24}$ are all F.

12. A liquid crystal medium according to claim 1, wherein said medium further contains one or more compounds of formula III-2

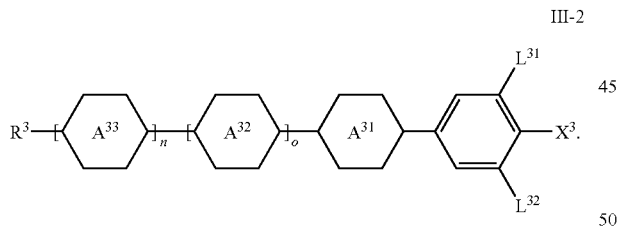

13. A liquid crystal medium according to claim 12, wherein component B further comprises one or more compounds selected from formula III-1b

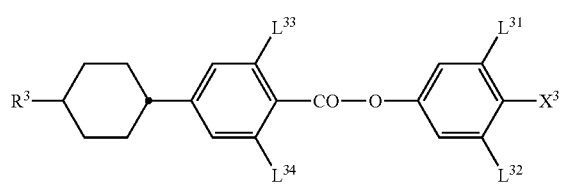

wherein $L^{33}$ and $L^{34}$ are, independently, H or F.

14. A liquid crystal medium according to claim 12, wherein said one or more compounds of formula III-2 are selected from formulae III-2a to III-2h

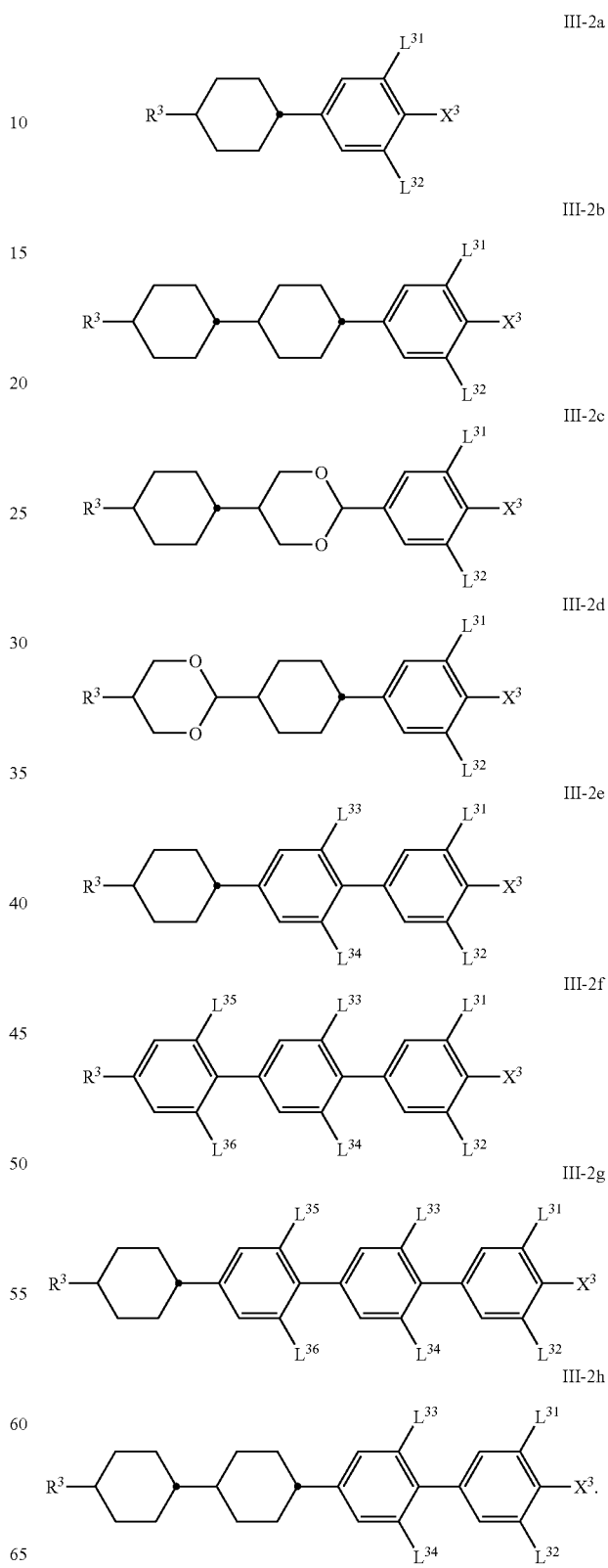

15. In a liquid crystal display comprising a liquid crystal medium wherein said medium is a medium according to claim 1.

16. A liquid crystal display according to claim 15, wherein said medium is addressed by an active matrix.

17. In a method of generating an electro-optical effect using a liquid crystal display, the improvement wherein said display is a display according to claim 15.

18. A liquid crystal medium according to claim 4, wherein said medium further comprises an additional dielectrically neutral component, component D having a dielectric anisotropy in the range from −1.5 to 3, and component D comprises one or more dielectrically neutral compounds, having a dielectric anisotropy in the range from −1.5 to 3, of formula VI:

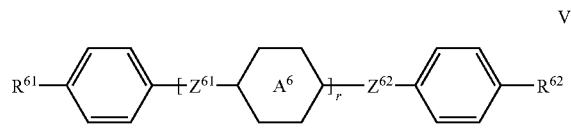

VI wherein
$R^{61}$ and $R^{62}$, independently of each other are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms, or fluorinated alkenyl having 2 to 7 C-atoms,

and in case it is occurring twice in each occurrence independently of each other, is

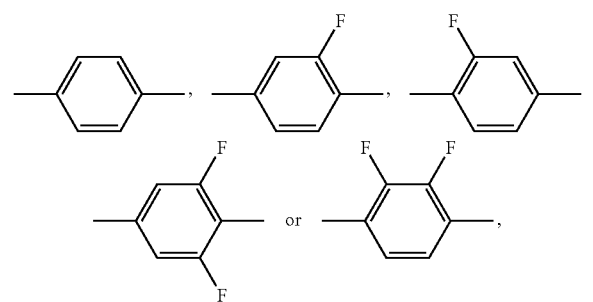

$Z^{61}$ and $Z^{62}$ are, independently of each other, and in case $Z^{61}$ is present twice, also these independently of each other, —CH$_2$CH$_2$—, —COO—, trans- —CH═CH—, trans- —CF═CF—, —CH$_2$O—, —CF$_2$O— or a single bond, and r is 0, 1 or 2.

19. A liquid crystal medium according to claim 1, wherein said medium contains said dielectrically neutral component, component C, comprising one or more dielectrically neutral compounds having a dielectric anisotropy of −1.5 to 3.

20. A liquid crystal medium according to claim 10, wherein said one or more compounds of formulae II-2a to II-2d are selected from the compounds of formulae II-2a-1, II-2a-1, II-2b-1, and II-2d-1:

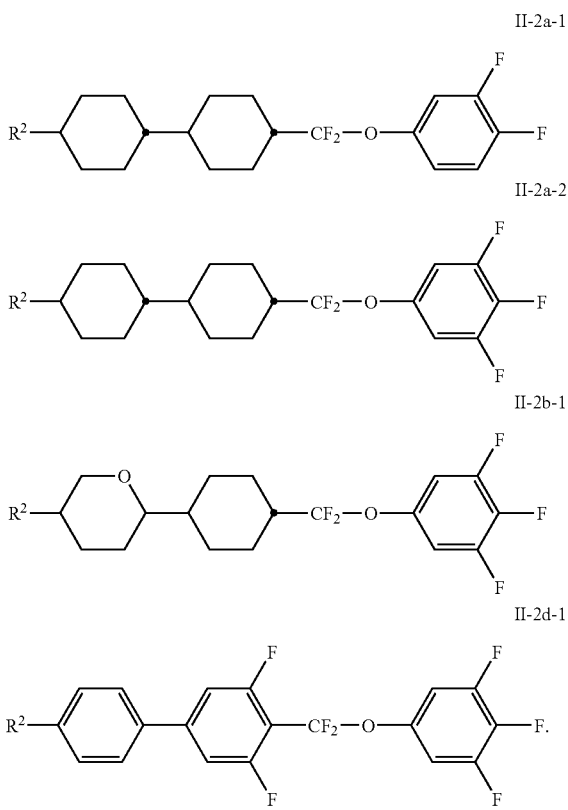

21. A liquid crystal medium according to claim 14, wherein said one or more compounds of formulae III-2a to III-2h are selected from formulae III-2a-1 to III-2a-4, III-2b-1 to III-2b-6, III-2c-1, III-2d-1, III-2e-1 to III-2e-5, III-2f-1 to III-2f-5, III-2g-1 to III-2g-3, and formulae III-2h-1 to III-2h-3:

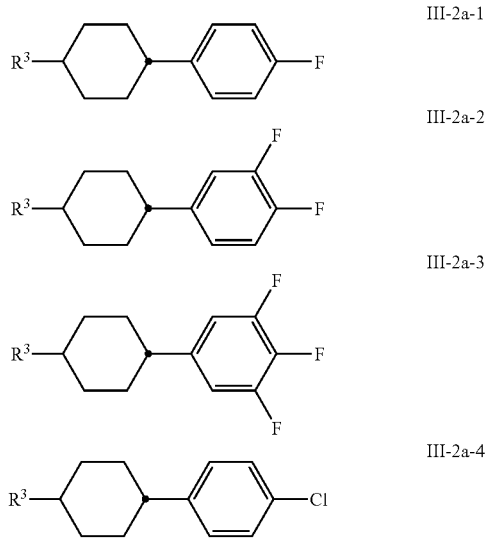

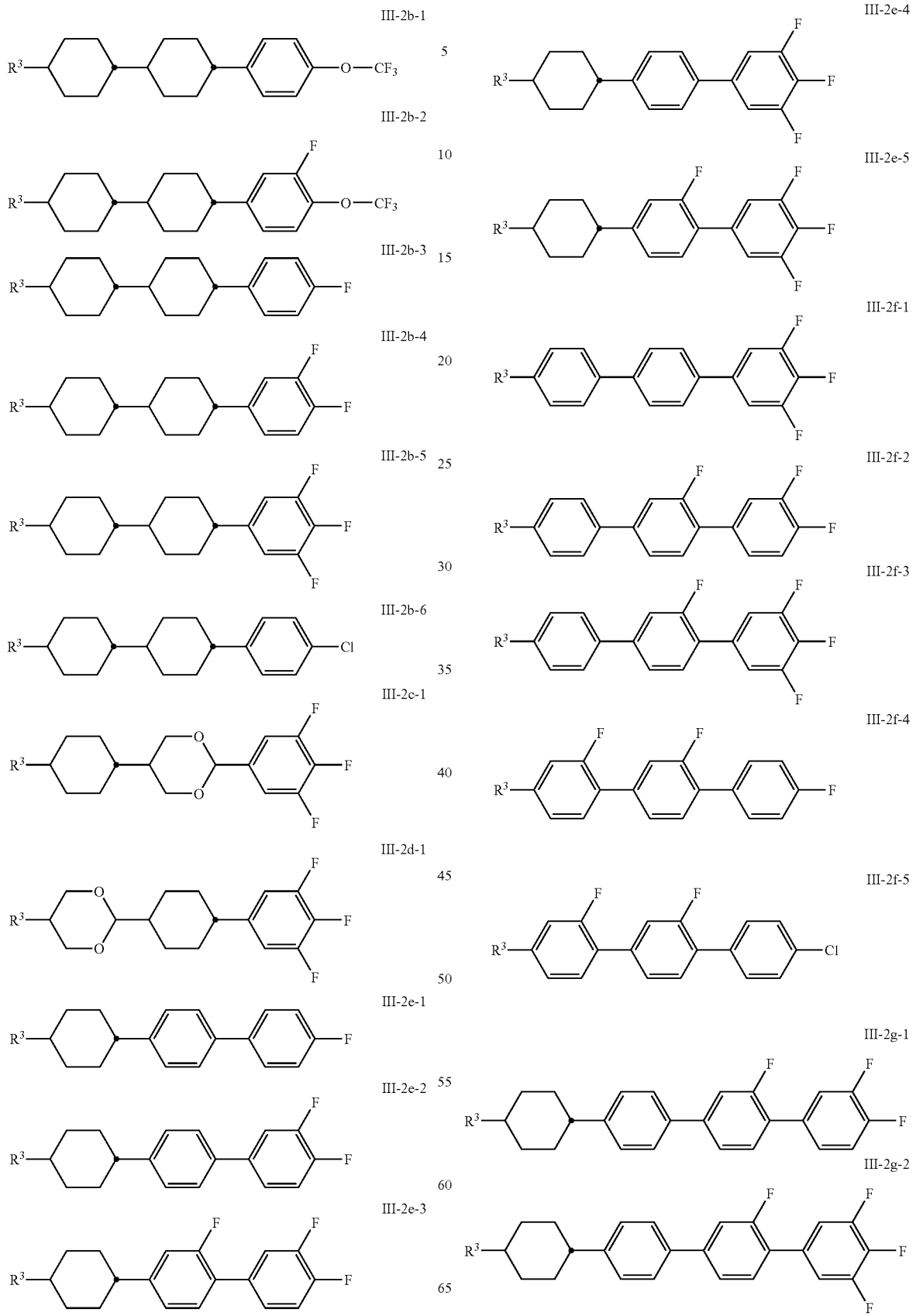

-continued

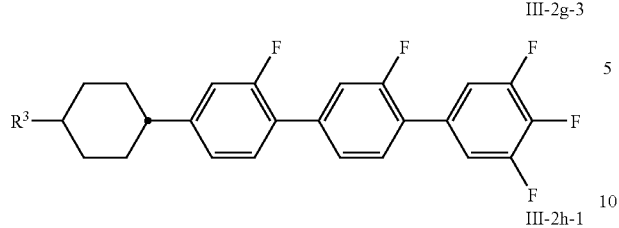
III-2g-3

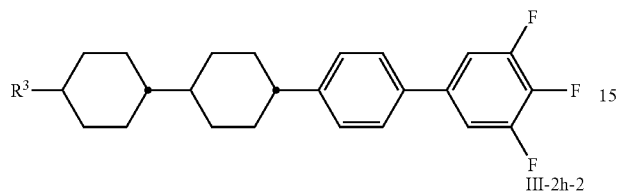
III-2h-1

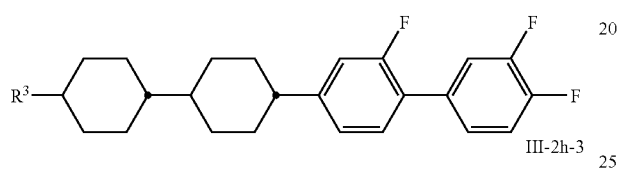
III-2h-2

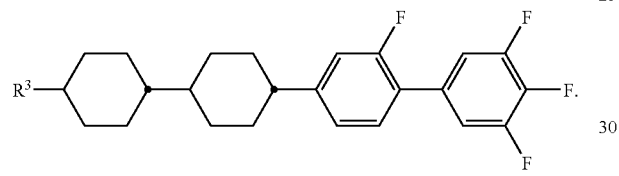
III-2h-3

22. A liquid crystal medium comprising:
a first dielectrically positive component, component A, comprising at least one dielectrically positive compound of the formula

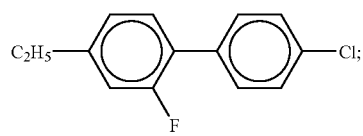

a second dielectrically positive component, component B, comprising one or more dielectrically positive compounds having a dielectric anisotropy of more than 3; and
optionally a dielectrically neutral component, component C, comprising one or more dielectrically neutral compounds having a dielectric anisotropy of −1.5 to 3;
wherein component B comprises one or more compounds selected from formulae II-1a to II-1i, and optionally one or more compounds of formula III II-1a

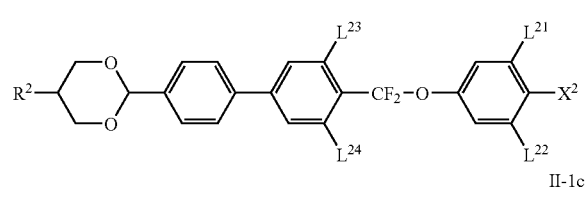
II-1b

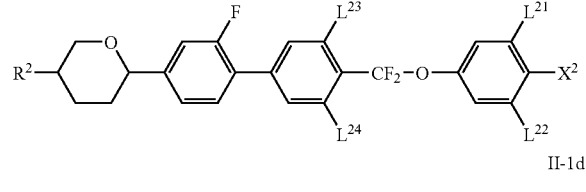
II-1c

II-1d

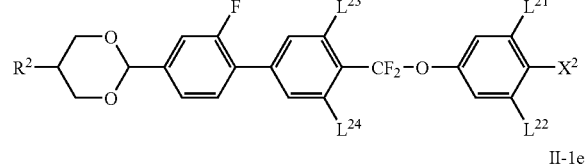
II-1e

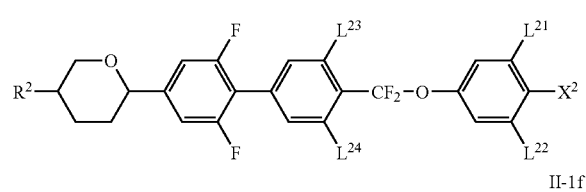
II-1f

II-1g

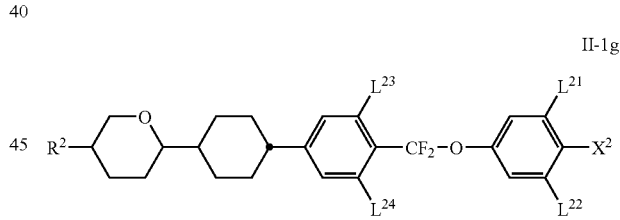
II-1h

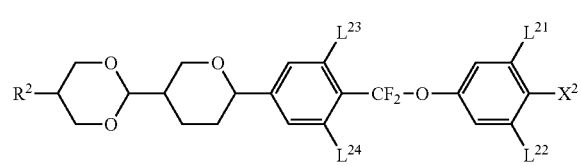
II-1i

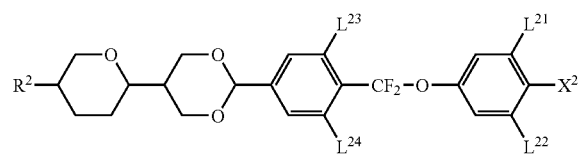

-continued

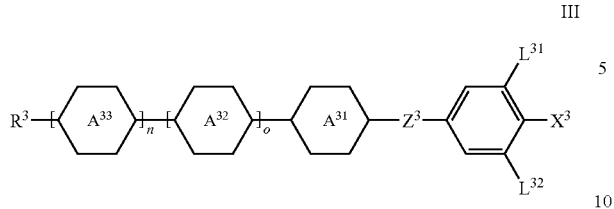

III wherein

R² and R³ are, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms, or fluorinated alkenyl having 2 to 7 C-atoms,

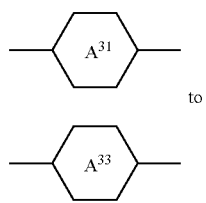

to are, independently of each other,

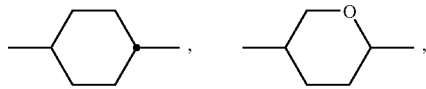

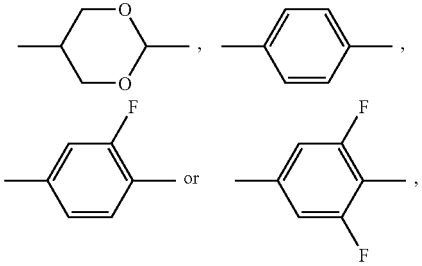

$L^{21}$, $L^{22}$, $L^{23}$, $L^{24}$, $L^{31}$ and $L^{32}$ are, independently of each other, H or F, $X^2$ and $X^3$ are, independently of each other, halogen, halogenated alkyl having 1 to 3 C-atoms, halogenated alkoxy having 1 to 3 C-atoms, halogenated alkenyl having 2 to 3 C-atoms, or alkenyloxy having 2 or 3 C-atoms, and $Z^3$ is —CH₂CH₂—, —CF₂CF₂—, —COO—, trans- —CH═CH—, trans- —CF═CF—, —CH₂O— or a single bond, and n and o are, independently of each other, 0 or 1.

23. A liquid crystal medium according to claim 22, wherein $L^{21}$ and $L^{22}$ are each F, $L^{23}$ and $L^{24}$ are each F, or $L^{21}$, $L^{22}$, $L^{23}$ and $L^{24}$ are all F.

24. In a liquid crystal display comprising a liquid crystal medium wherein said medium is a medium according to claim 22.

25. A liquid crystal display according to claim 24, wherein said medium is addressed by an active matrix.

26. In a method of generating an electro-optical effect using a liquid crystal display, the improvement wherein said display is a display according to claim 24.

\* \* \* \* \*